(12) United States Patent
Turgeman et al.

(10) Patent No.: US 9,665,703 B2
(45) Date of Patent: May 30, 2017

(54) DEVICE, SYSTEM, AND METHOD OF DETECTING USER IDENTITY BASED ON INTER-PAGE AND INTRA-PAGE NAVIGATION PATTERNS

(71) Applicant: BioCatch Ltd., Lod Industrial Area (IL)

(72) Inventors: Avi Turgeman, Cambridge, MA (US); Itai Novick, Rehovot (IL); Yaron Lehmann, Tel Aviv (IL); Lev Kadyshevitch, Tel Aviv (IL); Edo Dekel, Tel Aviv (IL)

(73) Assignee: BioCatch Ltd., Tel Aviv (IL)

( * ) Notice: Subject to any disclaimer, the term of this patent is extended or adjusted under 35 U.S.C. 154(b) by 119 days.

(21) Appl. No.: 14/320,656

(22) Filed: Jul. 1, 2014

(65) Prior Publication Data

US 2014/0317726 A1  Oct. 23, 2014

Related U.S. Application Data

(63) Continuation-in-part of application No. 13/922,271, filed on Jun. 20, 2013, now Pat. No. 8,938,787, and
(Continued)

(51) Int. Cl.
*G06F 21/32* (2013.01)
*G06F 21/31* (2013.01)
*H04W 12/06* (2009.01)

(52) U.S. Cl.
CPC ............. *G06F 21/32* (2013.01); *G06F 21/31* (2013.01); *G06F 21/316* (2013.01); *H04W 12/06* (2013.01)

(58) Field of Classification Search
CPC ........ G06F 21/31; G06F 21/316; G06F 21/32; G06F 2221/2133; G06F 21/554;
(Continued)

(56) References Cited

U.S. PATENT DOCUMENTS 5,557,686 A * 9/1996 Brown ............... G07C 9/00142
340/5.51
6,337,686 B2 * 1/2002 Wong ........................... 345/443
(Continued)

*Primary Examiner* — Kambiz Zand
*Assistant Examiner* — Tongoc Tran
(74) *Attorney, Agent, or Firm* — Eitan, Mehulal & Sadot

(57) ABSTRACT

Systems, devices, and methods for detecting identity of a user of an electronic device, and for determining whether or not an electronic device is being used by a fraudulent user; as well as for detecting identity of a user based on inter-page and intra-page navigation patterns. A method includes: during a first session of a user, who utilizes a pointing device and a keyboard for interacting with a computerized service, monitoring pointing device dynamics and gestures and keystrokes of the user; analyzing the monitored pointing device dynamics and gestures and keystrokes, in relation to (a) state and context of the computerized service, and (b) user interface elements displayed by the computerized service; generating a user-specific biometric trait indicating a user-specific service usage pattern, which includes at least one of: a user-specific inter-application usage pattern, and a user-specific intra-application usage pattern.

43 Claims, 9 Drawing Sheets

Related U.S. Application Data a continuation-in-part of application No. 13/877,676, filed as application No. PCT/IL2011/000907 on Nov. 29, 2011, now Pat. No. 9,069,942.

(60) Provisional application No. 61/843,915, filed on Jul. 9, 2013, provisional application No. 61/417,479, filed on Nov. 29, 2010.

(58) Field of Classification Search
CPC ...... H04W 12/06; H04L 63/06; H04L 63/126; H04L 2463/082
USPC .................................. 726/7, 19; 455/441
See application file for complete search history.

(56) References Cited

U.S. PATENT DOCUMENTS

| | | | | |
|---|---|---|---|---|
| 6,337,919 B1* | 1/2002 | Dunton | ............... | G06F 21/32 345/163 |
| 7,139,916 B2* | 11/2006 | Billingsley | ............ | G06F 21/36 380/255 |
| 2003/0033526 A1* | 2/2003 | French | ................. | G06F 21/31 713/168 |
| 2003/0212811 A1* | 11/2003 | Thornton | ............ | G06F 3/1431 709/231 |
| 2005/0008148 A1* | 1/2005 | Jacobson | ............... | G06F 3/038 380/26 |
| 2006/0143454 A1* | 6/2006 | Walmsley | ............... | G06F 21/85 713/170 |
| 2006/0195328 A1* | 8/2006 | Abraham | ............. | G06Q 20/204 235/382 |
| 2007/0266305 A1* | 11/2007 | Cong | .................... | G06Q 30/02 715/700 |
| 2007/0283416 A1* | 12/2007 | Renaud | ................... | G06F 21/31 726/2 |
| 2009/0254336 A1* | 10/2009 | Dumais | ................. | G06F 9/4443 704/9 |
| 2010/0082747 A1* | 4/2010 | Yue | ................... | G06F 17/30873 709/204 |
| 2010/0328074 A1* | 12/2010 | Johnson | .................. | G06F 21/31 340/573.1 |
| 2011/0102570 A1* | 5/2011 | Wilf | ....................... | G06F 3/017 348/77 |
| 2011/0113388 A1* | 5/2011 | Eisen | ....................... | G06F 21/32 715/856 |
| 2011/0208681 A1* | 8/2011 | Kuecuekyan | ........ | G06N 99/005 706/21 |
| 2011/0251823 A1* | 10/2011 | Davis | ..................... | G06Q 30/02 702/181 |
| 2011/0276414 A1* | 11/2011 | Subbarao | ............. | G06Q 20/102 705/14.73 |
| 2012/0154173 A1* | 6/2012 | Chang | .................... | G01S 7/032 340/904 |
| 2012/0157106 A1* | 6/2012 | Wang | .................... | H04W 16/04 455/446 |

\* cited by examiner

US 9,665,703 B2

DEVICE, SYSTEM, AND METHOD OF DETECTING USER IDENTITY BASED ON INTER-PAGE AND INTRA-PAGE NAVIGATION PATTERNS

CROSS-REFERENCE TO RELATED APPLICATIONS

This application claims priority and benefit from U.S. provisional patent application No. 61/843,915, titled "System, Device, and Method of Detecting Identity of a User of an Electronic Device", filed on Jul. 9, 2013, which is hereby incorporated by reference in its entirety.

This application is a Continuation-in-Part (CIP) of U.S. patent application Ser. No. 13/922,271, filed on Jun. 20, 2013, which is hereby incorporated by reference in its entirety.

This application is a Continuation-in-Part (CIP) of U.S. patent application Ser. No. 13/877,676, filed on Apr. 4, 2013; which was a National Phase of PCT International Application number PCT/IL11/00907, filed on Nov. 29, 2011; which claimed priority and benefit from U.S. provisional patent application No. 61/417,479, filed on Nov. 29, 2010; all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of an electronic device, and for determining whether or not an electronic device is being used by a fraudulent user; as well as for detecting identity of a user based on inter-page and intra-page navigation patterns.

In some embodiments, a method comprises: during a first session of a user, who utilizes a pointing device and a keyboard for interacting with a computerized service, monitoring pointing device dynamics and gestures and keystrokes of said user; analyzing the monitored pointing device dynamics and gestures and keystrokes, in relation to (a) state and context of said computerized service, and (b) user interface elements displayed by said computerized service; generating a user-specific biometric trait indicating a user-specific service usage pattern, which comprises at least one of: a user-specific inter-application usage pattern, and a user-specific intra-application usage pattern.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements or components. The figures are listed below.

DETAILED DESCRIPTION OF THE PRESENT INVENTION

Figure 1:
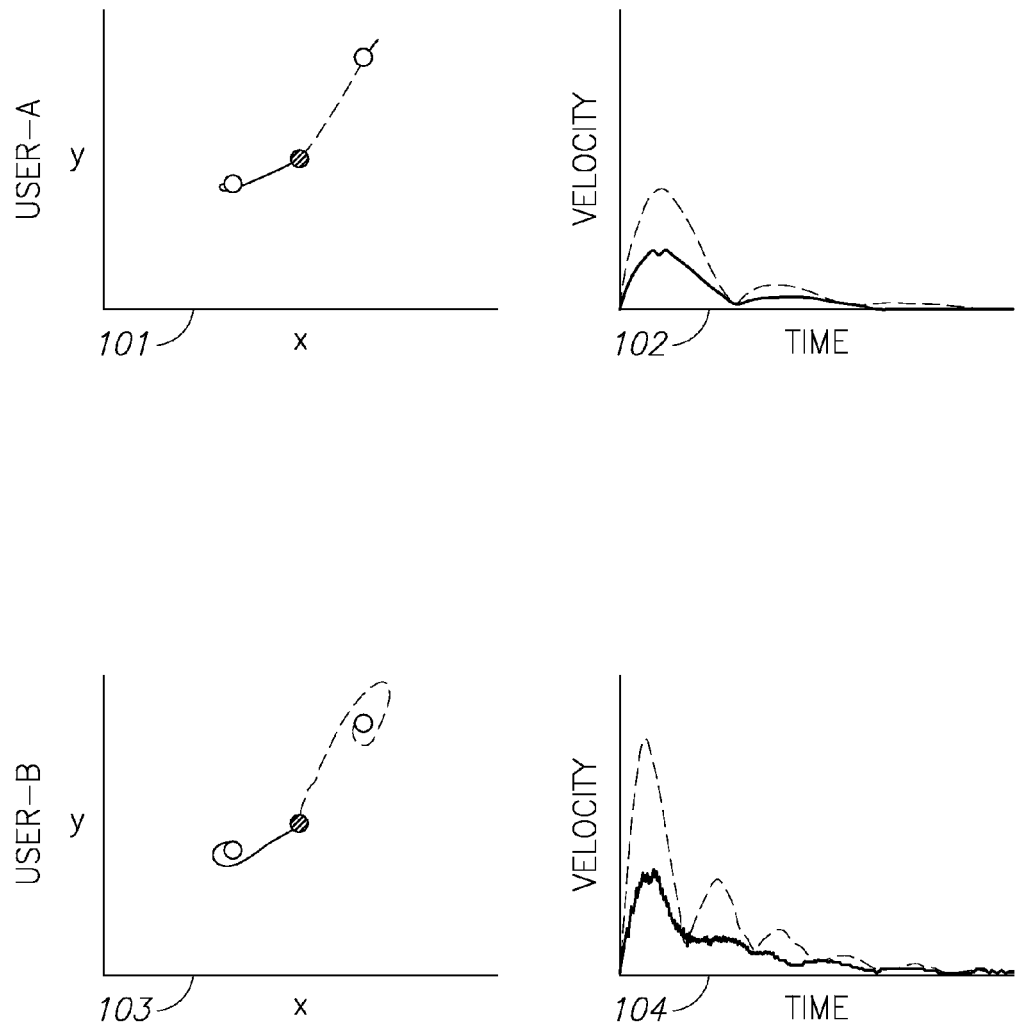
FIG. 1 is a schematic illustration of charts which demonstrate characteristics of control loops that may be determined and/or estimated in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The present invention may include a non-portable system (e.g., for desktop computers or for non-portable computing devices) and/or a mobile or portable system (e.g., for mobile devices, smartphones, tablets), which may utilize multi-modal passive-biometric integration of algorithms (e.g. kernel-SVM, random forests classification, machine-learning algorithms, non-machine-learning algorithms) applied on features of behavior (e.g., curve features, affine transformation of x-y space, motor control theory based features, as well as keyboard and mouse synergy such as the time interval between mouse move and keyboard typing). The systems may actively challenge (interact with) the user unconsciously, thereby allowing active sensing of biometric traits or user-specific traits (e.g., to deduce user-specific traits of hand-eye coordination), thereby enabling detection or confirmation of user identity, or confirmation that a user is indeed the genuine user (e.g. the account owner), or detecting that a user is estimated to be a non-genuine user or a "fraudster" or cracker or hacker or imposter or illegitimate user.

The passive solution is demonstrated herein in the context of fraud preventing of a remote access application, for example, accessing a bank account or brokerage account over a wired or wireless communication link (e.g., Internet connection, cellular link, Wi-Fi link, WAN, LAN, or the like). A first method may extract unique cognitive motor parameters; whereas a second method may extract unique behavioral, physiological and/or anatomical parameters. Their combination may allow biometric accuracy for continuous user authentication.

In accordance with the present invention, a first demonstrative method may extract and utilize user-specific traits that relate to sensorimotor control (or, motor control) of a pointing device (e.g., a mouse). The sensorimotor control system is affected by several factors, including, for example, anatomical features, the system's noise level and previous sensorimotor events. As a result, internal representations of the action-perception loop may differ between users. The method may capture parameters of the action-perception loop in a task that involves usage of the pointing device. These parameters cover, for example, the motor and sensory noise, the control loop parameters, or the like. It is clarified that the discussion herein may utilize, interchageably, terms such as "motor control", "motor control loop", "motor control loop model", "sensori-motor control", "sensori-motor control loop", "sensori-motor control loop model", and/or similar terms (e.g., motor-control-related parameters, functions, equations, calculations, or the like).

By estimating the user's specific sensorimotor control parameters, the system may extract user's traits which are more inherent and less task-dependent. In a demonstrative model, a movement starts at rest in $(x_0, y_0)$ and ends at rest in $(x_1, y_1)$ where x and y represent the horizontal and vertical components of the position of a cursor on a screen, respectively. In some embodiments, a control loop (e.g., of the second order) may assume that the force of the hand on the mouse, may be governed by a linear combination of two components (or two terms): the translation error (the distance to the target), and the current velocity.

The translation error (in the x axis) at time (t) may be represented using Equation (1):

$$\Delta x = (x_1 - x(t)) \quad (1)$$

The current velocity for the x-axis, $v_x$ (and similarly, $v_y$, for the y-axis) may be represented using Equation (2):

$$v_x = \frac{d}{dt} x(t) \quad (2)$$

Three control loop features, regarding the hand's displacement along the x-axis (and similarly, for the y-axis) may be extracted using Equation 3:

$$\frac{d^2 x(t)}{dt^2} = \alpha_x \Delta x + \beta_x v_x + n_x \quad (3)$$

In Equation (3), $\alpha_x$ and $\beta_x$ are loop parameters; and $n_x$ is the sensorimotor control noise (e.g. Gaussian random variable).

Accordingly, the system may simulate trajectories which may be similar to human traits.

Reference is made to FIG. 1, which is a schematic illustration of charts 101-104 which demonstrates characteristics of control loops that may be determined and/or estimated in accordance with some demonstrative embodiments of the present invention. Each chart describes two hand/mouse movements, represented by solid and dashed lines. Charts 101-102 correspond to a first user ("User-A"), whereas charts 103-104 correspond to a second user ("User-B"). Charts 101 and 103 demonstrate a screen cursor displacement in two dimensions, x and y, resulted by the movement; whereas charts 102 and 104 demonstrate the current hand/mouse velocity, as a function of time.

Charts 101-104 demonstrate a second order control loop of two different users, characterized by different control loop and noise parameter values.

Although the velocity curve (e.g., chart 102) may be different for each movement (e.g., solid vs. dashed lines in chart 102), it may be generated by the same model parameters. By estimating these parameters, the system may distinguish between a genuine user and an intruder or fraudster or imposter, regardless of the specific movements actually performed in a specific session; as demonstrated by a comparison of "User-A" and "User-B" in the charts, generated by different control loop and noise parameters values.

This demonstrative model may be extended to take into account other models of sensorimotor control, including forward and feedback models. For example, if the error terms are distorted by a non-linear function, such as, $sign(x) \sqrt{|x|}$, then the system may achieve different properties of movements such as synchronized peak velocities for different movements (e.g., demonstrated in chart 104).

In accordance with the present invention, the motor traits of each user may be modeled and/or detected, thereby building a model which corresponds to each user and represents motor traits of that user. In some embodiments, for example, a motor model may be built for each user based on hand movements and/or gestures of the user within K sessions (e.g., K may be equal to 1, or 2, or 5, or 12, or 40, or other positive integer, indicating the number of previous sessions). Then, in a subsequent session, actual motor behavior of a tested user may be captured and compared to the previously-modeled motor behavior of that user. If the currently-captured motor behavior corresponds to the pre-calculated user-specific model, then the system may determine that the current user is indeed the genuine user. In contrast, if the currently-captured motor behavior does not correspond to the pre-calculated user-specific model, then the system may determine or may estimate that the current user is not the genuine user, and may generate an alert or alarm, may send notification(s) to relevant personnel or administrators, and/or may require the user to perform additional security tasks (e.g., to contact a customer service or fraud department by phone, to utilize two-factor authentication, to answer one or more pre-defined security questions, or the like).

A demonstrative experiment has collected input from N=64 users, each user performing approximately m=40 virtual bank transactions on a demonstration website. For each mouse stroke, the system extracted several user-specific features (including sensorimotor control related features) and calculated an estimate of the parameters of the linear model presented above. The system ranked the features using the random forest machine learning algorithm.

The sensorimotor control related features were among the best user-specific features for detecting and/or confirming user identity.

Figure 2:
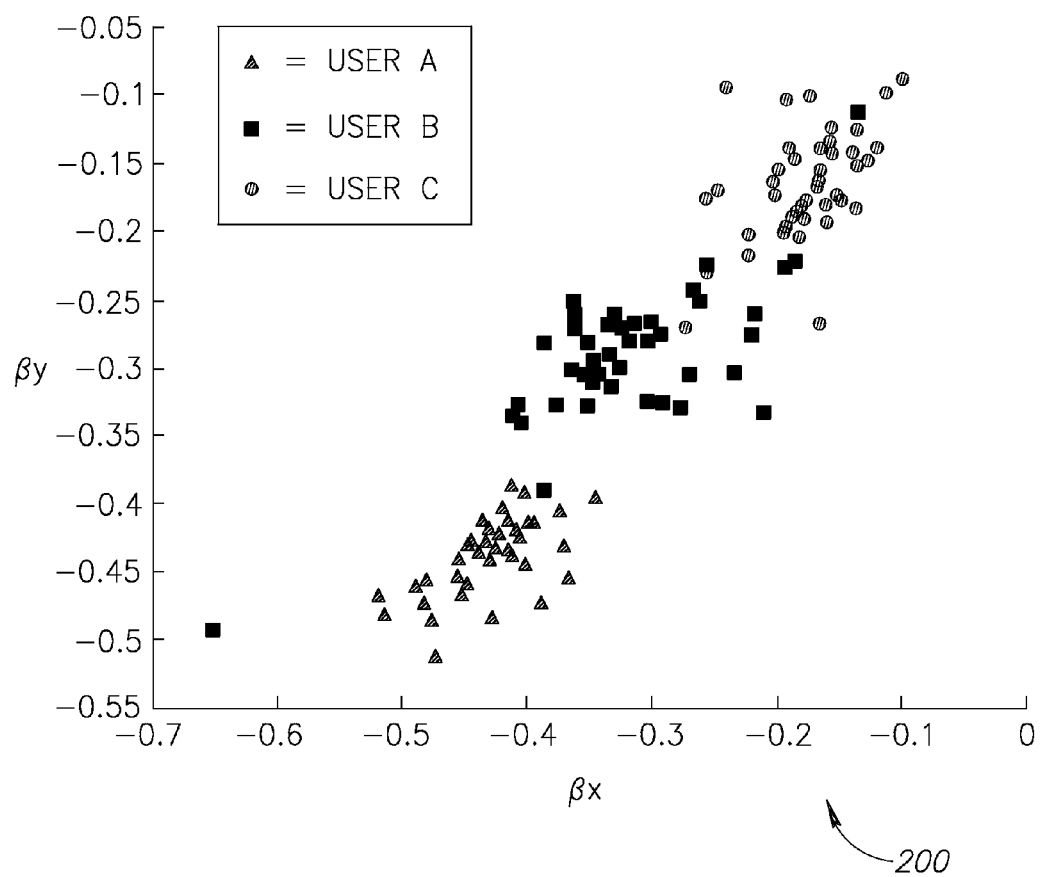
FIG. 2 is a schematic illustration of a chart demonstrating some of experiment results in accordance with the present invention.

Reference is made to FIG. 2, which is a schematic illustration of a chart 200 demonstrating some of the experiment results in accordance with the present invention. In chart 200, each one of the three symbols represents a different user. Chart 200 demonstrates the space of $\beta_x$ and $\beta_y$, averaged over the different strokes in a session (the average number of strokes is per session approximately 50). Chart 200 demonstrates a clear discrimination potential among three users (depicted by utilizing three colors or three different symbols), and further demonstrates the system's ability to uniquely identify each user according to his or her cognitive behavioral profile.

In accordance with the present invention, hand or cursor trajectories may be used to extract or estimate biometric parameters or user-specific information. Some conventional methods attempted to extract user-specific features that were based on direct measures of the trajectory, such as the perpendicular error; the limitation of these methods is that the less the environment is controlled, the more the user's activity is heterogeneous and thus the within subject variability of some features is high. The present invention utilizes the theory of sensorimotor control of movement for improved model-based biometrics and user-specific feature extraction, which may be a robust, task independent description of a user's interaction with a computer, a computing device, an electronic device, a mouse, an input unit, or the like, and may also predict movement dynamics in a new environment (e.g., a new application or website or web-page that the user did not access before) and/or under an intentional (undetected) distortion of the relationship between the positions of hand and the cursor (e.g., visuo-motor rotation). The present invention may allow to predict the behavior of a particular user under a rotation distortion, given a trained model of the user's sensorimotor control parameters.

The present invention may identify or detect that a user is attempting to pose as another user. Different users are likely to have different motor-control related characteristics. Therefore, different users are likely to move differently their hand, when controlling an electronic device. By modeling and estimating the motor and cognitive characteristics of a user, and by utilizing these characteristics to test a new set of data (e.g., an attempt to log in to a email account) the system may detect a fraud or a possible fraud, e.g., a fraudster attempting to interact with a website that a genuine user had accessed before and that the system had already built a sensorimotor control model for the genuine user.

The present invention may address attempts to falsify an identity. If a "bot" or automated program or scripts attempts to falsify identity of a human user, it is expected to move the cursor or pointer differently than humans in general and differently than the specific genuine user in particular. By extracting the sensorimotor control parameters of a current interaction session, the system may detect suspicious non-human activity, posing as a genuine human user. Moreover, if a fraudster opens multiple accounts, he or she may be over-trained with the target application (or website, or web-page), thereby having a dedicated trained sensorimotor control loop for the target application (or website, or web-page); and this in turn might be detected as suspicious activity. It is noted that the present invention may avoid capturing any personally identifiable information (PII) while extracting and/or utilization of biometric (or user-specific) features.

The present invention may utilize motor-control related modeling and analysis, in order to extract user-specific traits. Instead of, or in addition to, searching for repeated patterns in user interactions within an application, the present invention may utilize a comprehensive approach which synergizes system identification, a control-engineering discipline, sensorimotor control related features, and a cognitive-science discipline, thereby allowing the system to "reverse engineer" the process in order to find individual parameters for biometric purposes. This may enable robustness and improved performance, as well as the ability to predict user-specific patterns of movement under new environment, e.g. as challenge-response.

In accordance with the discipline of control engineering, the present invention may utilize system identification (SI) and statistical methods to build mathematical models of dynamical systems from measured data corresponding to user interactions or gestures. The system estimates the parameters of a sensorimotor control model which describes the action-perception loop of the hand-eye coordination in mouse and touch dynamics, by using SI techniques. For example, the system may extract the motor and sensory noises and the control loop parameters, which may be used for building a biometric profile.

The system may measure each feature independently for both axes (x-axis and y-axis), and may also measure several statistics over it. e.g., mean, standard deviation, range, maximum, minimum, kurtosis, skewness, quantiles, or the like. The sensorimotor control model accuracy may be improved by testing higher orders and linear-non-linear transformation to encapsulate non-linear effects (e.g., based on Fitt's law).

In accordance with the present invention, an experiment was held with 200 anonymous users who were directed to a virtual yet realistic bank account management website. To demonstrate the concept of reverse engineering of a motor control loop, a user moves the cursor from initial location $x_0$ to target position $x_1$ (generalization may be performed, to two dimensions).

The system ranked the features using Random Forest Classification, and yielded motor-control features which were in the top ten list of best features.

An experiment showed that applying system identification (SI) techniques on a motor control model of movement may produce highly robust features, which are not based merely on the specific movement statistics, but rather, are based on a generative model which encapsulates cognitive human traits or other user-specific traits.

In accordance with the present invention, another demonstrative embodiment may monitor, identify, and utilize Inter and Intra Application Usage Stream or interaction stream. The system may capture the user's application usage behavior, by monitoring and tracking the sequence and time span of each application screen or web-page (inter-page sequence), as well as navigation order and time span between the user-interface elements within each screen or web-page (intra-page sequence). The system may capture the user's application usage behavior, by monitoring and tracking the user page-specific intra-page behavior, such as, order of navigation between fields (text input, buttons, select-boxes, or the like), angle and/or velocity of entering and exiting each field, average or typical time spent in each field, location of mouse clicks within each field (e.g., right-side, center, left-side), or the like. The system may condition behavioral biometric traits (e.g., mouse movements, mouse clicks, keystrokes) on the application and task; thereby reducing the heterogeneity in behavior due to the actual software application in use.

Figure 3:
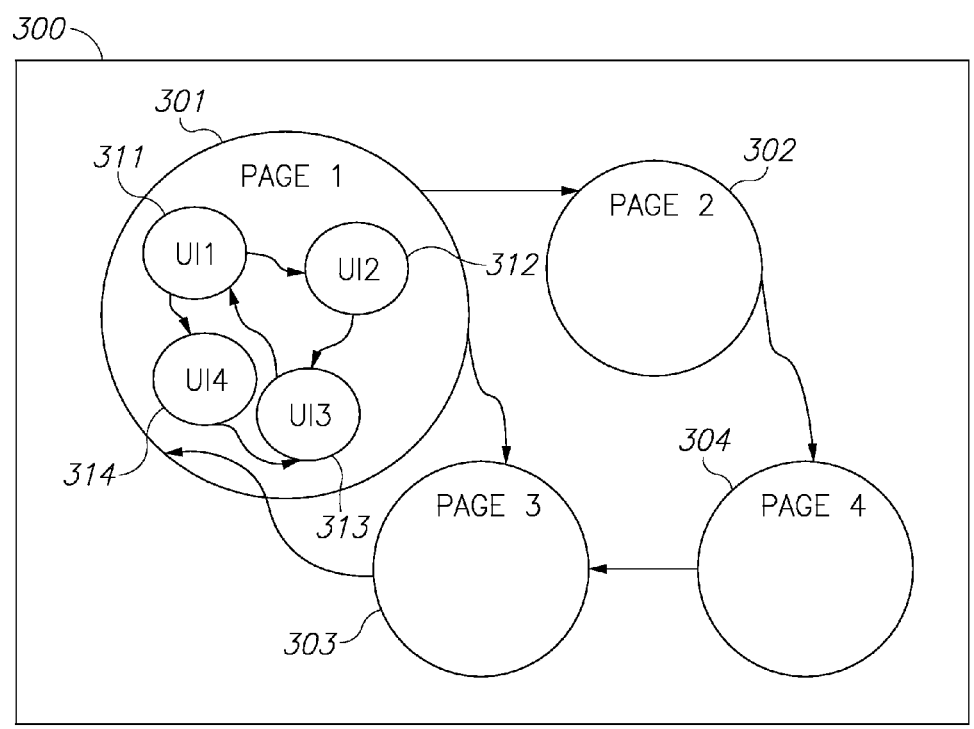
FIG. 3 is a schematic illustration of a map demonstrating utilization of user-specific usage stream model, in accordance with the present invention.

Reference is made to FIG. 3, which is a schematic illustration of a map 300 demonstrating utilization of user-specific usage stream model, in accordance with the present invention. Each one of the external circles 301-304 represents an application or a website (or, a specific page in an application or website). Each one of the inner circles 311-314 represents a user-interface (UI) element (e.g., a dialog box, a drop-down menu, a radio button, a checkbox, a field in a form, a "submit" button, a button, or the like). Each transition is characterized by an associated transition probability. Moreover, each state, whether external or internal, is also characterized by the time duration.

The system may model the behavior as a hierarchical fully observed continuous-time Markov chain, where each state is represented by a page in the first level and an element in the second level. Optionally, some embodiments may extend the model to semi-Markov chain, or Markov renewal process.

The user profile may be characterized by the initial distribution to start with: state $x_0$ ($Pr(x_0)$), the transition probability matrix to move from state $x_{t-1}$ to state $x_t(Pr(x_t|x_{t-1}))$ and the distribution of time duration $T_t$ given the current state and possibly the previous state: $Pr(T_t|x_t,x_{t-1})$. These statistics may be estimated from a supervised training set.

When a new session is observed, the system may compare the observed Markov chain with the empirical expected model by a statistical test; for example, by measuring one or more of: the $\chi^2$ test of goodness of fit (GOF), the exact goodness of fit, and/or the likelihood or the log ratio test between the hypothesis that the session belongs to the (declared) user and the hypothesis that it is not. Similarly, the system may compute the GOF of the observed mean duration per page and the GOF of the session length. The first may be done, for example, by the likelihood of an exponential model, or by computing a two-sample Kolmogorov-Smirnov test.

In accordance with the present invention, different users navigate differently between applications (or websites), and within an application (or within a website). For example, some users utilize the Alt-Tab key combination in Windows, or shift between browser tabs, more often than other users do. Within an application or webpage, some people use some UI elements more than others. For instance, in a banking website or web-page or application, users perform different tasks and have different task control-flow (e.g., firstly checking the current balance, then making a payment; or, firstly checking online messages, then checking debits, then checking credits). For example, User-A may typically check his account balance, and only then perform an online payment to a utility company; whereas User-B may typically review a snapshot of her account, then read any waiting messages, and only then perform an online payment. Even if multiple users have the same working flow, they may spend different time periods in different applications (or application pages, or application segments) or user-interface elements. For example, User-A typically spends approximately 3 to 5 seconds reviewing his bank account balance; whereas User-B typically spends approximately 18 to 25 seconds reviewing her bank account balance.

Figure 4:
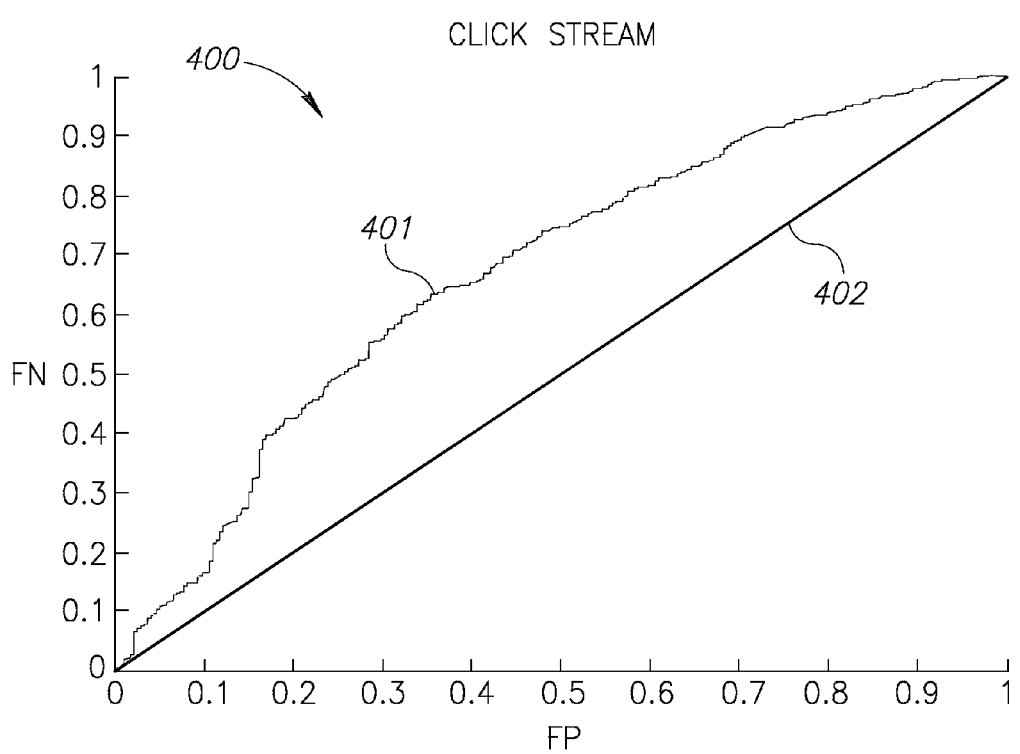
FIG. 4 is an illustration of a graph chart demonstrating experiment results in accordance with the present invention.

Reference is made to FIG. 4, which is an illustration of a graph chart 400 demonstrating experiment results in accordance with the present invention. In a demonstrative experiment, information was collected from 30 participants reading a web-based news site. The system collected the time duration and page name of the main site categories (e.g., sports, science, politics). Graph chart 400 depicts the experiment results, demonstrating receiver operation curve (ROC) of page stream analysis in that news website. The horizontal axis (denoted FP) represents False Positive Error; the vertical axis (denoted TP) represents True Positive value. The curved graph line 401 indicates the ROC curve, or indicates that the decision by the above analysis that the user is genuine is statistically significant; compared to the straight graph line 402 which indicates 50% chance to make a mistake or to give a true answer, or which indicates 50% chance by pure guessing that the user is genuine (or not genuine).

The present invention utilizes a high level of behavioral-based biometric parameters corresponding to application usage flow (or website usage flow, or web-page usage flow, or service usage flow), instead of (or in addition to) utilizing low-level motor behavior of mouse dynamics and/or keystroke dynamics. Optionally, the present invention may condition the low-level motor behavior to specific application usage, e.g., how do users behave when they perform a certain task in a certain application. Some behavioral biometric measurements of keystroke and/or mouse dynamics may be critically dependent on the application or task within an application (e.g., typing speed in a spreadsheet application versus a word processing application). By closely monitoring the application changes, the system may build and update an interaction behavioral model which is task-dependent and/or application-dependent. Integrating a general non-application-dependent biometric model with application-depended models may further increase biometric performance.

The present invention may identify a "fraudster" or imposter or a user attempting to pose as another individual, or trying to "spoof" the system. An imposter would need to replicate the genuine user patterns of activity, including time span at each application window (or web-page, or web-section) and user-interface element. This may be highly unlikely, and may be very difficult for a fraudster (or for an automatic script) to know or to predict or to imitate. By combining signal processing and learning algorithms, the system may generate a specific model for each genuine user and test new samples of interaction for their "goodness of fit" with the pre-trained model or the previously-generated model (e.g., built based on previous interaction sessions of that logged-in user). Furthermore, false or fake identity derived from automated scripts or software is likely to have a regular transition rate with small variance, which is not typical to humans; and therefore, detecting this type of fraudulent activity may also be possible. In some embodiments of the present invention, no personally identifiable information (PII) needs to be collected or stored in order to allow the biometric modality to function.

Figure 5:
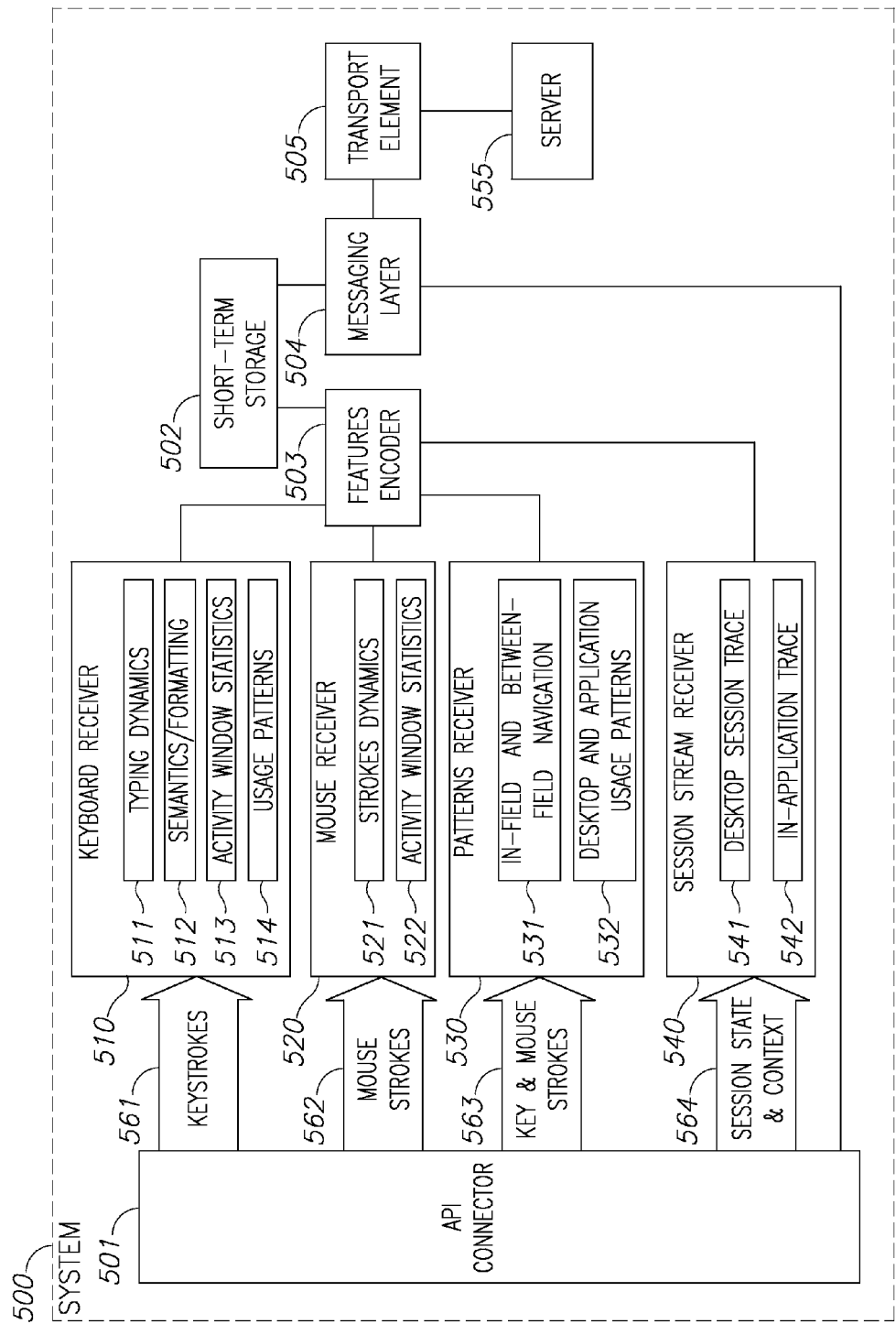
FIG. 5 is a schematic block-diagram illustration of a system in accordance with some demonstrative embodiments of the present invention.

Reference is made to FIG. 5, which is a schematic block-diagram illustration of a system 500 in accordance with some demonstrative embodiments of the present invention. At an overview, for example, a desktop client may run as a Microsoft Windows service, and may communicate with a provided Application Programming Interface (API) and with a server using REST calls or other suitable bindings. The connector subscribes to key/mouse/application events, and dispatches the events towards or among multiple (e.g., four) receivers or receiver modules. Each of the receiver modules internally buffers the data, as some of the features examined are activity-window related (as opposed to single-stroke related). The receiver modules periodically generate new keys. The rate of the generation may be based on the rate of fresh-data flow. The keys may be delivered to the encoder, which encrypts and stores them in storage (e.g., volatile or non-volatile storage). The messaging module may reliably transmit these keys to the server, and may receive trust-level indicators in the responses, which may be reported back via the API. Other suitable architectures may be used.

For example, system 500 may comprise an API connector 501 which may interface with a service, a software, an application, a web-based service, a browser-based service, a server-side service or application, a client-side service or application, a web-site, or the like. API connector 501 may have access to mouse dynamics, keystroke dynamics, UI and GUI elements displayed and/or used, the particular pages or regions of the application that are being used, and/or other data. API connector 501 may transfer keystroke data (arrow 561) to keyboard receiver module 510; API connector 501 may transfer mouse strokes data (arrow 562) to mouse receiver module 520; API connector 501 may transfer key and mouse strokes data (arrow 563) to session stream receiver module 530; API connector 501 may transfer session state and context data (arrow 564) to session stream receiver module 540. Other suitable receiver modules may be used.

Keyboard receiver module 510 may comprise, for example, a typing dynamics module 511 able to analyze or determine user-specific characteristics or traits of typing dynamics; a semantics/formatting module 512 able to define the context of which the keystrokes being inserted; an activity window statistics module 513 able to collect and/or aggregate statistic data about the activity window relative to the monitored keystrokes; and a usage patterns module 514 able to identify other suitable user-specific usage patterns that may be derived from analysis of keystrokes. Keyboard receiver module 510 may output a set or batch, of one or more biometric or behavioral traits, that are user-specific and correspond to the particular user interacting via the keyboard in the particular current session being monitored. The output feature(s) may be transported to a features encoder module 503.

Mouse receiver module 520 may comprise, for example, a mouse strokes dynamics module 521 able to analyze and/or determine user-specific traits based on the captured or monitored mouse strokes dynamics; and an activity window statistics module 522 able to collect and/or aggregate statistic data about the activity window relative to the monitored mouse dynamics. Mouse receiver module 520 may output a set or batch, of one or more biometric or behavioral traits, that are user-specific and correspond to the particular user interacting via the mouse in the particular current session being monitored. The output feature(s) may be transported to the features encoder module 503.

Patterns receiver module 530 may analyze the monitored user interactions in order to identify and/or detect user-specific behavioral traits; for example, by utilizing in-field and between-field navigation module 531 able to detect a pattern of in-field navigation and/or between-field navigation (e.g., performed with the mouse, or performed with the Tab key); by utilizing a desktop and application usage pattern module 532 able to detect a usage pattern in the application, such as, online banking, e-commerce, healthcare, email, social networks, etc. Patterns receiver module 530 may output a set or batch, of one or more biometric or behavioral traits, that are user-specific and correspond to the particular user utilizing the particular application (or service, or software, or website, or web-page) in the particular current session being monitored. The output feature(s) may be transported to the features encoder module 503.

Session stream receiver module 540 may receive session state and context data, and may detect user-specific behavioral traits related to the session stream of the particular user being monitored in the current particular interaction session. For example, a desktop session trace module 541 may monitor and detect the session trace in a desktop application; and an in-application session trace module 542 may monitor and detect the in-application usage trace. The session stream receiver module 540 may determine, for example, that the user checked her account balance before making an online payment; or, that the user reviewed past orders before placing a new order; or, that the user checked her inbox messages before performing a wire transfer. Such user-specific behavioral traits may be transferred to the features encoder module 503 (e.g., for further comparison with previously-captured user-specific behavioral traits).

The features encoder 503 may utilize short-term memory 502 to temporarily store the received inputs. The features encoder 503 may encode or translate the received inputs into a pre-defined format that allows efficient transport of the extracted behavioral features to a remote server 555, using a messaging layer 504 and a transport element 505 (e.g. a wired or wireless communication link or transceiver).

Server 555 may receive the encoded user-specific features, together with data indicating which user is currently being monitored (e.g. based on his username, or based on data corresponding to his username); and may retrieve from a database or a storage unit previously-stored record(s) for that particular user, indicating previously-stored user-specific features or patterns. The server may compare the currently-captured behavioral traits, to previously-captured or typically-identified traits of that particular user; and may generate one or more response indicator(s), which may be sent back via the messaging layer 504 and may then be transported back to the service or software being used by the user via the API connector 501.

For example, server 555 may determine that in the currently-monitored interaction session, the current user moves between fields by using mouse clicks; whereas, in all or in 90 percent (or another threshold percentage) of past interactions that correspond to the currently logged-in user, movement between fields was performed with the Tab key on the keyboard; and thus, server 555 may send back a response indicating "possibly fraudulent interaction", which may be used (by itself, or by taking into account other responses for that user) to trigger further actions (e.g., to block the currently logged-in user from performing subsequent operation, or a certain type of operations, or to require the user to contact customer service via phone, or the like).

In another example, server 555 may detect that the currently-monitored logged-in user is accessing the wire transfer section of a banking website, immediately after logging-in; whereas, in previous interactions of that logged-in user, the user had always (or had typically) checked the account balance and checked incoming messages before accessing the wire transfer section. Accordingly, server 555 may send back a "suspicious activity" response that may trigger further user-authentication steps or may impose certain usage restrictions which may be lifted if the user performs additional authentication measures.

Figure 6:
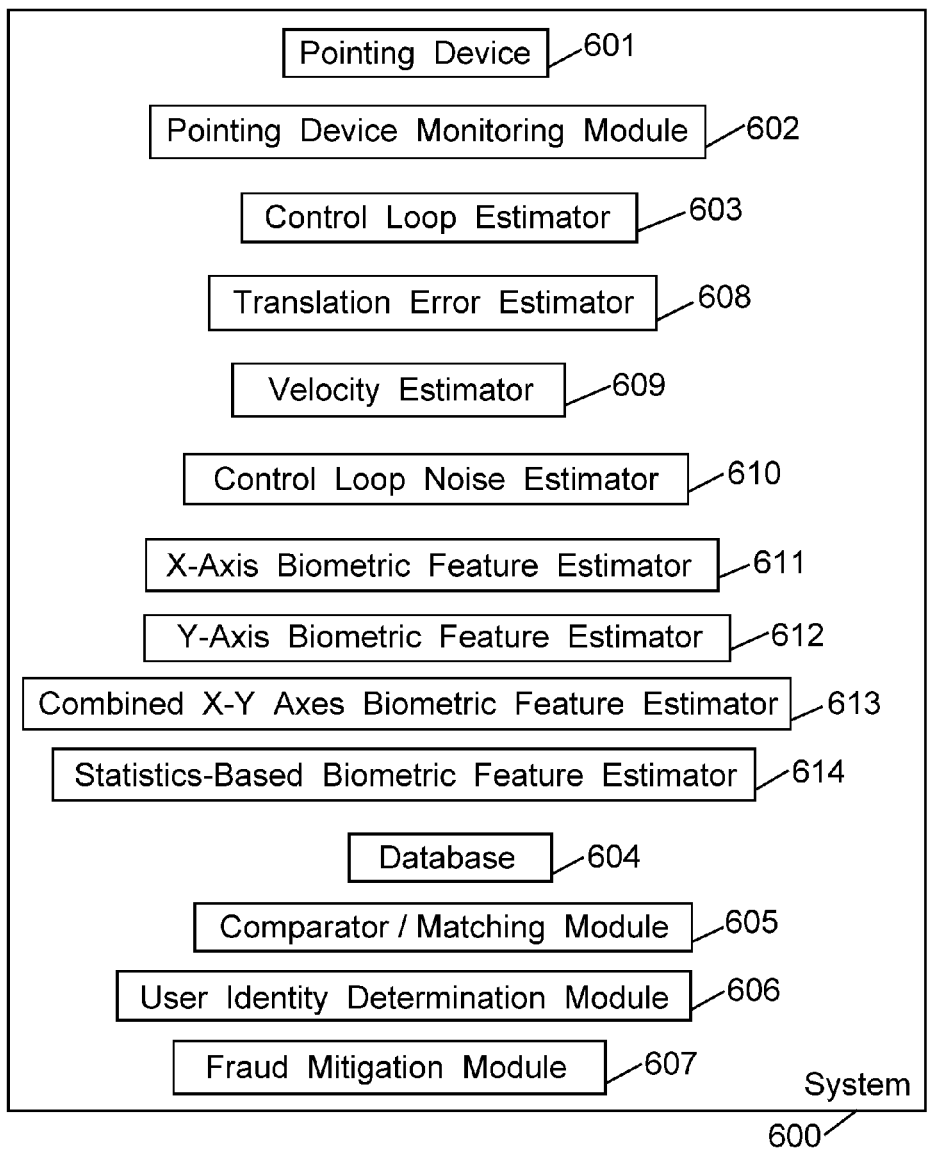
FIG. 6 is a schematic illustration of a system, in accordance with some demonstrative embodiments of the present invention.

Reference is made to FIG. 6, which is a schematic illustration of a system 600 in accordance with some demonstrative embodiments of the present invention. System 600 may comprise hardware components and/or software modules, able to perform operations, estimations, calculations and/or other tasks as described above, in order to implement the functionalities of the present invention.

System 600 may comprise, for example: a pointing device 601 that a user may utilize in order to operate (or interact with) an electronic device and/or to access a system or a service; a pointing device monitoring module 602 able to monitor and/or track and/or capture, for example, dynamics and/or gestures related to the pointing device; a control loop estimator 603 (or a control loop model estimator) able to estimate or calculate or determine values of parameters that characterize a control loop (or a control loop model) of a user, based on monitored point device dynamics and/or gestures; and a database 604 to store records indicating association among users (e.g., logged-in users, and/or non-logged-in users) and their respective control loop models (or the values of the parameters of their control loop models).

System 600 may further comprise: a comparator/matching module 605 able to compare (or match) current values of control loop model of a current user, to previously-stored values of control loop model(s) of one or more previous sessions and/or user(s); a user identity determination module 606 able to determine or to estimate, based on the results of control loop model parameters comparison, whether or not a current user is the same person as a previous user; a fraud mitigation module 607 able to perform one or more fraud mitigating steps based on a determination that a current user is not, or may not be, the genuine user (e.g., by requiring the current user to respond to a challenge, to answer security question(s), to contact customer service by phone, to perform two-step authentication or two-factor authentication, or the like).

System 600 may further comprise: a translation error estimator 608 able to estimate a translation error parameter associated with a user; a velocity estimator 609 able to estimate velocity of dynamics and/or gestures of a user; a motor control noise estimator 610 able to estimate a motor control noise of a user; an x-axis biometric feature estimator 611 able to estimate a biometric feature or trait of the user along the x-axis based on monitored point device dynamics and/or gestures; a y-axis biometric feature estimator 612 able to estimate a biometric feature or trait of the user along the y-axis based on monitored point device dynamics and/or gestures; a combined x-y axes biometric feature estimator 613 able to estimate a biometric feature or trait of the user along a combination (e.g., a complex combination) of the x-axis and the y-axis, based on monitored point device dynamics and/or gestures; and a statistics-based biometric feature estimator 614 able to estimate a user-specific biometric feature by calculating a statistics function applied to the x-axis control loop and/or the y-axis control loop (or to a combination thereof), for example, able to apply mean, standard deviation, range, maximum, minimum, kurtosis, skewness, quantiles, or other function(s).

Figure 7:
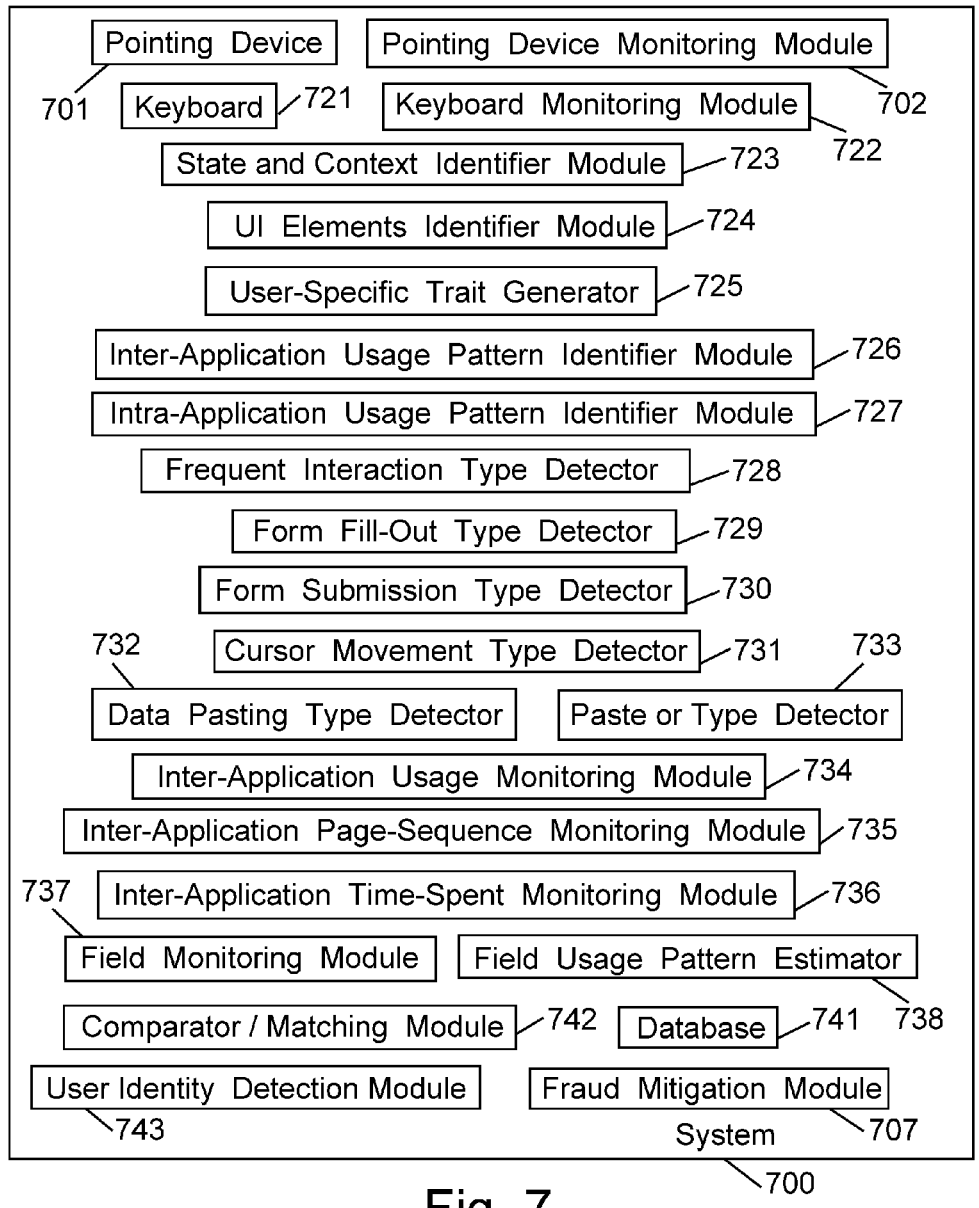
FIG. 7 is a schematic illustration of another system, in accordance with some demonstrative embodiments of the present invention.

Reference is made to FIG. 7, which is a schematic illustration of a system 700 in accordance with some demonstrative embodiments of the present invention. System 700 may comprise hardware components and/or software modules, able to perform operations, estimations, calculations and/or other tasks as described above, in order to implement the functionalities of the present invention.

System 700 may further comprise, for example: a pointing device 701; a pointing device monitoring module 702; a keyboard 721 allowing a user to input keystrokes; a keyboard monitoring module 722 to monitor and/or track and/or store keystrokes entered by the user; a state-and-context identifier module 723 able to identify and store the state and/or the context of a service or web-site or web-page or application, corresponding to a particular keystroke or a particular set of keystrokes, and/or corresponding to particular pointing device dynamics and/or gestures; a UI elements identifier module 724 able to identify and store the UI or GUI elements that are displayed to the user and/or are utilized by the user; a user-specific trait generator 725 to generate a user-specific trait or parameter value, indicating a user-specific service usage pattern; a user-specific inter-application usage pattern identifier module 726 to estimate or calculate a user-specific inter-application usage pattern; and a user-specific intra-application usage pattern identifier module 727 to estimate or calculate a user-specific intra-application usage pattern.

System 700 may further comprise: a frequent interaction type detector 728 to determine whether a particular user more frequently utilizes the pointing device or the keyboard in order to perform a particular type of interaction with a service; a form fill-out type detector 729 to determine whether a particular user more frequently utilizes the pointing device or the keyboard in order to fill-out a particular form of a service (or a particular field of the service, or a particular data item of the service); a form submission type detector 730 to determine whether a particular user more frequently utilizes the pointing device or the keyboard in order to submit a particular form of a service; and a cursor movement type detector 731 to determine whether a particular user more frequently utilizes the pointing device or the keyboard in order to move the cursor within a service (e.g., among fields or among data items of the service).

System 700 may further comprise: a data pasting type detector 732 to determine whether a particular user more frequently utilizes the pointing device or the keyboard in order to perform a data paste operation in a particular form (or a particular field) of a service; a paste-or-type detector 733 to determine whether a particular user more frequently pastes data into a particular field or, alternatively, more frequently types data into that particular field; an inter-application usage monitoring module 734 to determine a user-specific inter-application usage pattern by monitoring and detecting that a particular user, in most of his/her interactions with a particular service, performs a first particular action prior to preforming a second particular action; an inter-application page-sequence monitoring module 735 to determine a user-specific page-sequence within a service or website, by monitoring and detecting that a particular user, in most of his/her interactions with a particular service or website, visits a first particular page prior to visiting a second particular page; and an inter-application time-spent monitoring module 736 to determine a user-specific inter-application time-spent trait, by monitoring and detecting that a particular user, in most of his/her interactions with a particular service or website, spends a first time-period at a first section (or web-page) of the service, and spends a second (different) time period at a second section (or web-page) of that service.

System 700 may further comprise: a field monitoring module 737 to monitor field(s) in a computerized service and to generate (in coordination with module 738 described herein) a user-specific field-usage pattern associated with each field of that service; for example, monitoring and/or taking into account one or more of: (a) a mouse angle of approach to the field, (b) a mouse angle of exit from the field, (c) velocities of mouse approach and mouse exit, (d) time period spent within the field, and/or (e) location of a mouse click event within the field. System 700 may further comprise a user-specific field-usage pattern estimator 738 to determine a user-specific field-usage pattern based on the monitored field(s) and interactions.

System 700 may further comprise, for example, a database 741 able to store the above-calculated parameters or traits or user-specific features, with the user to which they correspond; a comparator/matching module 742 able to compare (or match) currently-calculated features of a current usage session, with previously-stored features of a previous usage sessions (or multiple previous usage sessions); a user identity detection module 743 to determine, based on the comparison results, whether or not the current user is the same as a previous user (or is the genuine user); and a fraud mitigation module 707 able to perform one or more fraud mitigating steps based on a determination that a current user is not, or may not be, the genuine user.

The components and/or modules of system 600 and/or system 700 may be co-located, or may be distributed over multiple locations, multiple devices, a "cloud computing" service or system, a system utilizing client/server architecture, a system utilizing peer-to-peer architecture, or other suitable implementations. System 600 and/or system 700 may be implemented by using, for example, a processor, a processor core, a Central Processing Unit (CPU), an Integrated Circuit (IC), a logic circuit, a controller, memory units, storage units, input units, output units, wireless communication units (e.g., wireless transceiver), cellular communication units (e.g., cellular transceiver), wired communication units and/or links, or the like.

Some embodiments may characterize a user based on (a) the combination or assembly of motor-based units or motoric units (or motor-based elements, or motoric elements), and/or the particular user-specific sequencing and/or ordering and/or timing in which such motoric units are activated. The motoric units may be regarded as the "building blocks" of the motoric system of the human user. A motoric unit may comprise one or more muscles, nerves, cells, and/or other body parts that may be able to move, contract, shrink, expand, stretch, or otherwise modify their properties. For example, activation of a rapid motoric unit may cause application of force (e.g., movement) or other reaction within a short time period (e.g., within 20 or 50 or 75 milliseconds, or within the range of 10 to 80 milliseconds); whereas, activation of a slow motoric unit may cause application of force or other reaction within a longer time period (e.g., after at least 80 or 100 or 150 milliseconds).

Different humans may have different muscle profiles or bodily profiles, inherited or genetic profiles, different motoric coordination, different ability to activate and deactivate particular motoric unit(s) within certain timing or ordering or sequence, and/or other user-specific characteristics related to motoric units, which may be extracted or estimated by the present invention and may be utilized for user identification purposes, user authentication purposes, fraud detection purposes, or the like.

In a demonstrative implementation, a movement or a user-interaction with an electronic device or an input unit, may be captured or monitored, and may be divided into short segments (e.g., each segment corresponding to 20 or 30 or 40 or 50 milliseconds). Segments, or batches or sets of segments, may be analyzed and/or compared, or may be represented as a histogram in order to identify user-specific patterns or traits. In one example, a first user may move the input device to the right, while slightly moving it also clockwise (or upwardly; or downwardly); whereas, a second user may move the input device to the right, while slightly moving it also counter-clockwise (or upwardly; or downwardly). Such user-specific traits may be estimated and/or detected, and may be utilized for distinguishing or differentiating among users (e.g. a genuine user versus a fraudulent user).

Figure 8:
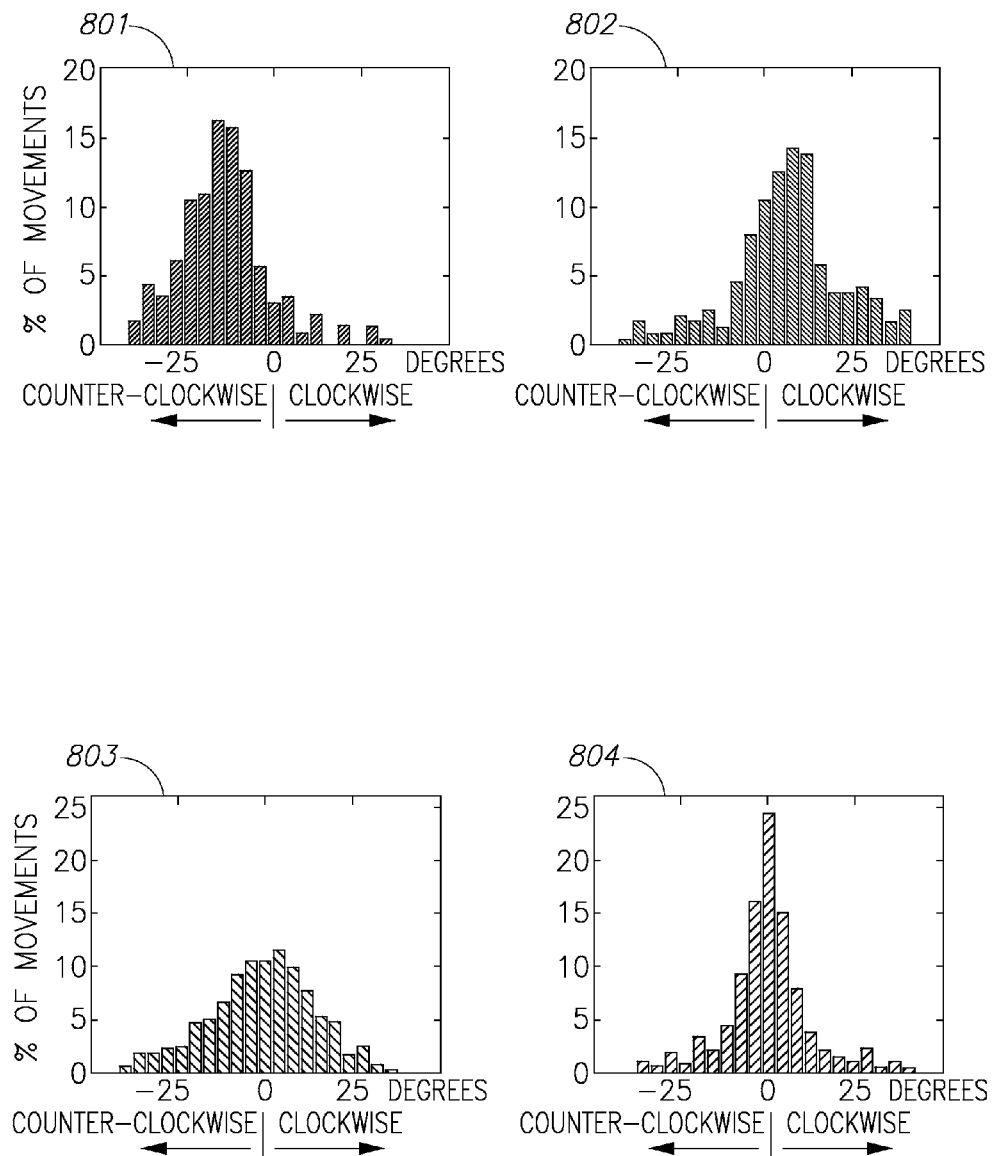
FIG. 8 is a schematic illustration of four histogram charts, in accordance with some demonstrative embodiments of the present invention.

Reference is made to FIG. 8, which is a schematic illustration of four charts 801-804 of histograms of segments, in accordance with some demonstrative embodiments of the present invention. The vertical axis in each chart 801-804 may indicate the percentage out of all movements (or segments) recorded for a certain type of movement (e.g., horizontal movement of the input device to the right). The horizontal axis in each chart 801-804 may indicate the angular deviation between segments; such that, for example, positive values indicate a clockwise movement or deviation; whereas, negative values indicate a counter-clockwise movement or deviation.

Chart 801 may correspond to User A, and chart 802 may correspond to User B. As demonstrated by charts 801-802, the system may detect that User A (chart 801) typically performs a slight counter-clockwise movement of the input device, when moving the input device horizontally to the right; whereas, User B (chart 802) typically performs a slight clockwise movement of the input device, when moving the input device horizontally to the right. This may be used for user identification, user authentication, fraud detection, or other purposes.

Chart 803 may correspond to User C, and chart 804 may correspond to User D. The variance in each chart 803-804 may be calculated, in order to extract user-specific traits related to the sequencing, timing and/or ordering of movements (or segments), which may indicate the user-specific coordination skills. For example, even though charts 803 and 804 do not show a clear skew of clockwise or counter-clockwise movement, charts 803 and 804 demonstrate that User C and User D have different coordination skills or different coordination sets; and such user-specific patterns may be used for user identification, user authentication, fraud detection, or other purposes.

Figure 9:
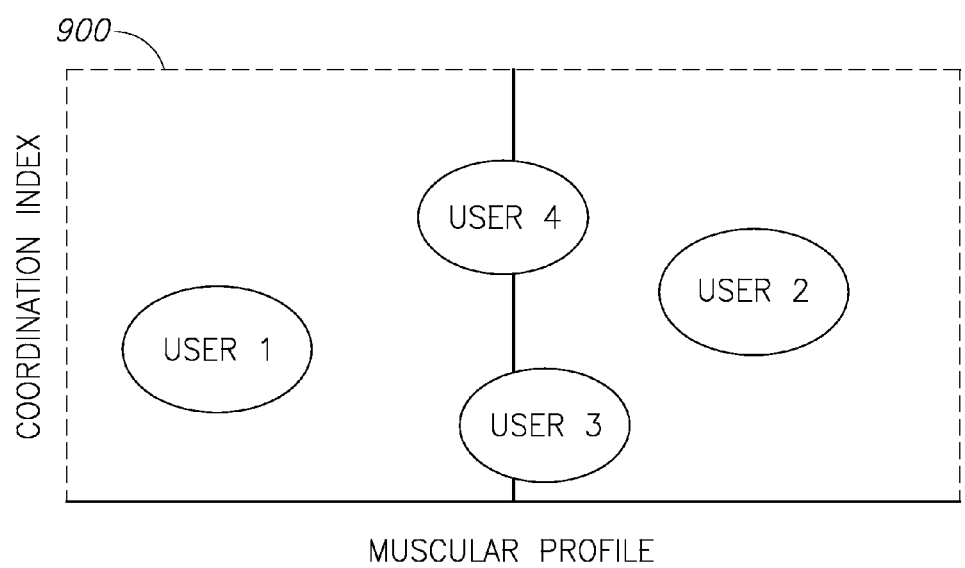
FIG. 9 is a schematic chart representing coordination index and muscular profiles of four users, in accordance with some demonstrative embodiments of the present invention.

Reference is made to FIG. 9, which is a schematic chart 900 representing coordination index and muscular profiles of four different users, in accordance with the present invention. For example, the user-specific muscular profile may be deduced or estimated (e.g., as demonstrated in charts 801-802); and the user-specific coordination index may be deduced or estimated (e.g., as demonstrated in charts 803-804. The horizontal axis may correspond to the muscular profile; whereas the vertical axis may correspond to the coordination index. Four different users (denoted User 1, User 2, User 3, and User 4) may have different estimated values of muscular profile and/or coordination index, thereby "placing" such four users in different locations or regions of the chart 900; and allowing to differentiate or distinguish among users, for user identification, user authentication, fraud detection, or other purposes.

Some embodiments may utilize a combination of one or more user-specific Physical Biometric (PB) features and/or one or more user-specific Cognitive Biometric (CB) features and/or one or more user-specific Behavioral Biometric (BB) features, which may be estimated or extracted, and then utilized for purposes of user identification, identity verification, fraud detection, fraud mitigation, differentiation or distinguishing among users, or other purposes. In the following discussion, a User Activity Window (UAW) may indicate all the movements of the input unit (e.g., all mouse movements and/or mouse clicks) during a usage session or during all usage sessions of a user; and a Stroke may indicate a part of the UAW. For example, the UAW may be divided into multiple strokes (or interaction elements, or interaction units), based on one or more events or triggers or conditions, such as: movement to another direction in a large angle (e.g., greater than 45 degrees); a long pause (e.g., greater than 200 or 300 or 400 milliseconds); a mouse-click or double-click (or, a drag-and-drop operation may be regarded as a single stroke); mouse-pointer is moved "out of" the screen or active window; or other criteria for division into strokes. Furthermore, a stroke may optionally be divided into stroke-parts, corresponding to "smooth" portions or parts of that stroke; although, in many cases, a stroke comprises a single smooth part which is the entirety of that stroke. In a demonstrative implementation, the following user-specific biometric traits may be extracted and then utilized, individually and/or in various combination(s) with each other.

A demonstrative user-specific biometric trait may comprise estimation of the user's arm length (PB-1): For long and straight or nearly-straight parts of a stroke, which are mostly along the X-axis, calculate the average radius of curvature; and average over the all strokes in the UAW.

A demonstrative user-specific biometric trait may comprise estimation of the user's wrist length (PB-2): For short parts of a stroke which are mostly along the X-axis, calculate the average radius of curvature; and average over the all strokes in the UAW.

A demonstrative user-specific biometric trait may comprise estimation of the user's (a) wrist range/flexibility of movement and (b) agility, to the right side (PB-3): For short parts of a stroke going right which are mostly along the X-axis, calculate the length of the part (for range) and the average speed, acceleration, deceleration and jerk along the part (for agility); and average over the all strokes in the UAW.

A demonstrative user-specific biometric trait may comprise estimation of the user's (a) wrist range/flexibility of movement and (b) agility, to the left side (PB-4): For short parts of a stroke going left which are mostly along the X-axis, calculate the length of the part (for range) and the average speed, acceleration, deceleration and jerk along the part (for agility); and average over the all strokes in the UAW.

A demonstrative user-specific biometric trait may comprise estimation of the user's dexterity of Fine Motor Skills (PB-5). For strokes that end in click on a web-page field: the ratio of stroke length to direct path, speed and angle change at the target (large speed change and shorter correction means more accuracy and dexterity), start speed, acceleration, deceleration and jerk; the system may combine some or all of these parameters to generate a measure of dexterity. Additionally or alternatively, with disturbances: Disabled button, Input field focus loss, moved target (and more) disturbances, forces the user to repeat her access to the button or change speed and angles of approach, thereby allowing again to measure or estimate dexterity.

A demonstrative user-specific biometric trait may comprise estimation of the user's fingers range of movement (PB-6). For short parts of a stroke which are mostly along the Y-axis, calculate the length of the part; average over the all strokes in the UAW.

A demonstrative user-specific biometric trait may comprise estimation of the user's mouse-wheel finger range of movement (PB-7): Find (a) maximal number of pixels scrolled by consecutive wheel events, and (b) maximal consecutive number of wheel events with no pause longer than a pre-defined value (e.g. 50 or 100 or 150 or 180 milliseconds).

A demonstrative user-specific biometric trait may comprise estimation of the user's elbow position (PB-8): Estimate whether or not the user's elbow is in the air (or is resting on a desk or table), by estimating variance of the length, speeds and acceleration is short parts of strokes going left and/or by estimating variance of the length, speeds and acceleration is short parts of strokes going right.

A demonstrative user-specific biometric trait may comprise estimation of the user's left-handedness or right-handedness (PB-9): Estimate whether the user is right-handed or left-handed, based on input unit interactions. For example, right-handed users may have stronger movement to the left than to the right; whereas left-handed users may have stronger movement to the right than to the left. Without disturbance, the system may estimate and compare (a) speed, acceleration, deceleration and jerk to left, with (b) speed, acceleration, deceleration and jerk to right, with regard to short parts of strokes and/or for long parts of strokes; or may otherwise compare the left and right agility, or the ratio of the average speeds and accelerations in PB-3 and PB-4. Additionally or alternatively, introduce a disturbance in which the mouse-pointer is stuck or disappears, and determine right-or-left handedness based on the direction of the oval or ellipse or circle that the user performs as a movement to find or refresh the mouse-pointer.

A demonstrative user-specific biometric trait may comprise estimation of the user's eye-hand coordination model, and/or eye-hand cognitive correction model, and/or eye-hand feedback model (CB-1), by estimating parameters of the user's motor control loop.

A demonstrative user-specific biometric trait may comprise estimation of the user's accuracy in reaching an on-screen target by utilizing an input device (CB-2); for example, as discussed above with reference to biometric trait PB-5.

A demonstrative user-specific biometric trait may comprise estimation of the user's eye saccades and/or smooth pursuit models (CB-3). For example, a stream of clicks of dragging of the mouse-pointer may be analyzed, and optionally, images or video from a front-facing camera of the electronic device may be analyzed, in order to estimate unique user-specific features of eye gazes or saccades of the user eye(s). Additionally or alternatively, the smooth pursuit user-specific features, allowing the user's eye(s) to closely follow a moving object, may be tracked and estimated based on similar data.

A demonstrative user-specific biometric trait may comprise estimation of the user's eye-hand coordination model (CB-4); for example, by using CB-2 and/or PB-5. Additionally or alternatively, a disturbance or interference may be introduced or injected to the user experience, such as, a rotation disturbance, allowing the system to measure how well (and/or how rapidly) the specific user compensates for such disturbance. Optionally, a compensatory-tracking task may be introduced, optionally disguised as a short-term interference or disturbance (e.g., without the user knowing that this is actually a challenge measuring his/her eye-hand coordination).

A demonstrative user-specific biometric trait may comprise estimation of the user's awareness (CB-5); for example, by calculating the time that is required for the specific user to process information when the page is loaded, and/or when the page is updated (but not reloaded). Additionally or alternatively, an interference may be introduced (e.g., the mouse-pointer may be disappeared or may become "stuck" or non-responsive), and the system may measure how long it takes the user to find out that something is "wrong" with the mouse-pointer, and/or how long it takes the user to find out that the mouse-pointer is operating "normally" again (e.g., the interference being removed).

A demonstrative user-specific biometric trait may comprise estimation of the user's reaction time(s) to various events (CB-6). For example, without introducing an interference, the system may calculate the time required for the specific user to process event(s) when page is loaded, and/or when the page is updated (and not reloaded). Additionally or alternatively, similarly to CB-5, the system may introduce an interference or disturbance and measure the user's reaction, for example, which type of reaction, direction of reactive movement, number of clicks in reactive action, properties of the reaction such as movement in circle or oval or straight line(s) or other shapes, the time length of such reaction, how long it takes the user to initiate the reaction and/or to perform the corrective action and/or to detect that the interference was removed, or the like; for example, reaction to the mouse-pointer or cursor becoming "stuck" or disappearing, or the "submit" button disappearing, or the like.

A demonstrative user-specific biometric trait may comprise estimation of the user's interactions in view of Hick's Law or Hick-Hyman Law (CB-7). For example, the system may introduce an interference which modifies the number of choices that are presented to the user on a page, allowing the system to estimate the parameter "b" in Hick's law, such that the processing time (T) is equal to $b \times \log_2 (n+1)$, where "n" denotes the number of equally probably choices. Additionally or alternatively, a visible Captcha mechanism may be used, and the system may modify the number of available choices and estimate the user-specific processing time or user-specific parameters in Hick's law equation.

A demonstrative user-specific biometric trait may comprise estimation of the user's interactions in view of Fitts's Law or Fitts' Law Law (CB-8). For example, the system may monitor the user's interactions to estimate the user-specific parameters that relate to the time required for that user to rapidly move to a target area, taking into account the distance and/or the target size. Some implementations may estimate one or more user-specific parameters in the Shannon formulation for movement along a single dimension, according to which, $T = a + b \times \log_2 (1 + D/W)$; where T indicates the movement time; a indicates the intercept (the start/stop time of the input unit); b indicates the slope, the inherent 1/speed of the device; D indicates the distance from the starting point to the center of the target; W indicates the width of the target measured along the axis of motion.

A demonstrative user-specific biometric trait may comprise estimation of the user-specific page usage stream model (BB-1). For example, the system may calculate the probabilities to move from a first page to a second page (e.g., from a pre-defined list of given pages), by estimating a Markov chain model per website and per user.

A demonstrative user-specific biometric trait may comprise estimation of the web-page fields usage stream model (BB-2); for example, calculating the probabilities to go from one field to a second field (in a given list of fields in a form or in the complete website), by estimating a Markov chain model per website (and/or per form) and per user.

A demonstrative user-specific biometric trait may comprise estimation of the mouse-related behavioral patterns, for a specific form or web-page (BB-3). For example, for each user the system may collect the user's average angles of approach to each field, angles of exit from each field; speed, acceleration, deceleration and jerk of approach; speed, acceleration, deceleration and jerk of exit; location of clicks in each field (e.g., center, right-side, left-side); types of movement (Tab key versus mouse), Fitts' Law parameters, time of movement between specific fields in the form; and in input fields, the time from click or Tab key to start of text input and time from end of text input to first mouse event. Different users have different preferences which may be determined uniquely on per-user basis.

A demonstrative user-specific biometric trait may comprise estimation of the mouse-related behavioral patterns, for page fields or per a type of UI elements or GUI elements (e.g., select boxes, buttons, input fields, drop-down menu) (BB-4). For example, the system may measure the user's average angles of approach to each UI element, angles of exit from each UI element; speed, acceleration, deceleration and jerk of approach; speed, acceleration, deceleration and jerk of exit; location of clicks in each UI element (e.g., center, right-side, left-side); types of movement (Tab key versus mouse), Fitts' law parameters, time of movement between specific UI element in the form; in input fields, the time from click or Tab key to start of text input and time from end of text input to first mouse event. Different users have different preferences which may be determined uniquely on per-user basis.

A demonstrative user-specific biometric trait may comprise estimation of the user-specific preferences that are reflected in UI interactions (BB-5); for example, determining whether the specific user prefers to scroll with a mouse-wheel or with the arrow keys on the keyboard or with the scroll bar in the margin of the page or with the scroll line in the touchpad; usage of the Tab key or the mouse in order to move between fields or UI elements; use of the mouse or the Enter key to submit a form or a query; or the like.

Some embodiments may calculate, estimate and/or utilize one or more of the following user-specific features, or a combination of some of them: average speed of input unit movement (e.g., mouse movement); standard deviation of the speed of movement; the 10% percentile (or other pre-defined percentile) of the speed of movement, or multiple different percentiles which may indicate about the user-specific distribution of speed-of-movement; average acceleration in the direction of movement (only positive values) (e.g., utilizing PB-2, PB-3, PB-4 and/or PB-6); average acceleration in the direction of movement (only negative values) (e.g., utilizing PB-2, PB-3, PB-4 and/or PB-6); standard deviation of acceleration in the direction of movement (e.g., utilizing PB-2, PB-3, PB-4 and/or PB-6); the 10% percentile of acceleration in the direction of movement (e.g., utilizing PB-2, PB-3, PB-4 and/or PB-6); the 90% percentile of acceleration in the direction of movement (e.g., utilizing PB-2, PB-3, PB-4 and/or PB-6); the number of positive values of acceleration in the direction of movement divided by number of negative values of acceleration in the direction of movement (e.g., utilizing PB-2, PB-3, PB-4 and/or PB-6); the average acceleration perpendicular to the direction of movement (only positive values) (e.g., utilizing PB-1, PB-2, PB-3, PB-4 and/or PB-6); the average acceleration perpendicular to the direction of movement (only negative values) (e.g., utilizing PB-1, PB-2, PB-3, PB-4 and/or PB-6); the median of absolute value of angular velocity (e.g., utilizing PB-1, PB-2, PB-3, PB-4 and/or PB-6); the 10% percentile of angular velocity (e.g., utilizing PB-1, PB-2, PB-3, PB-4 and/or PB-6); the 90% percentile of angular velocity (e.g., utilizing PB-1, PB-2, PB-3, PB-4 and/or PB-6); the standard deviation of angular velocity (e.g., utilizing PB-1, PB-2, PB-3, PB-4 and/or PB-6); the median of curvature (e.g., utilizing PB-1, PB-2, PB-3, PB-4 and/or PB-6); the 10% percentile of curvature (e.g., utilizing PB-1, PB-2, PB-3, PB-4 and/or PB-6); the 90% percentile of curvature (e.g., utilizing PB-1, PB-2, PB-3, PB-4 and/or PB-6); the median speed at a click event (e.g., utilizing CB-1); the average time between mouse-down and mouse-up events (e.g., zero value indicating none such events); the average direction of movement before a click (e.g., angle between the mouse at the click event, and the mouse K-events before the click, where K may be 3 or 5 or other positive integer), optionally taking into account or detecting circular movement prior to the click event, and optionally utilizing CB-1 and/or CB-2; Ratio of mouse move events to all mouse events; Ratio of mouse click events to all mouse events; Ratio of mouse wheel events to all mouse events; Ratio of sharp angles to all angles; the average angle of sharp (or wide) angles (e.g., utilizing PB-1, PB-2, PB-3, PB-4, PB-5 and/or PB-6); number or frequency of long breaks (e.g., a break of more than 100 or 200 or 300 or 400 milliseconds); an average break time; number or frequency of large jumps in movements, such that a large distance exists between two consecutive mouse events (e.g., distance greater than 100 or 150 or 200 pixels); average jump length of such large jumps; average time between last mouse move and the following click-event; or the like.

In some implementations, the speed of movement may be divided into three "bins"; the system may extract features that are the normalized number of speed values that are in bin X followed by a speed value in bin Y (hence 9 features); which may indicate the tendency of the user to have large speed movements followed by low speed movements (or vice versa); and optionally keeping constant the speed bin boundaries for each UAW.

In some embodiments, the system may measure or estimate for each mouse point/mouse event, in each stroke, some or all of the following 16 parameters: Speed (absolute velocity); Absolute acceleration; Absolute jerk (derivative of acceleration); Acceleration in direction of movement; Acceleration perpendicular to direction of movement; Affine curvature; Direction of movement (angle); First derivative of direction of movement; Second derivative of direction of movement; Curvature; First derivative of curvature; Second derivative of curvature; First derivative of dual_x; First derivative of dual_y; Second derivative of dual_x; Second derivative of dual_y; where dual_x and dual_y are the dual coordinates, which may be calculated as:

$$dual_x = v_y/(y \cdot v_x - x \cdot v_y) \quad (4)$$

$$dual_y = v_x/(x \cdot v_y - y \cdot v_x) \quad (5)$$

Optionally, the system may calculate or estimate, for each one (or for some of) the above-mentioned 16 parameters, one or more of the following ten indicators: Average; Standard deviation; Max value–Min value (span); Skewness; Kurtosis; 10% percentile; 25% percentile; 50% percentile; 75% percentile; 90% percentile. The above may yield 160 user-specific features (16 times 10), which may be estimated and/or utilized, individually or in suitable combinations.

Some embodiments may calculate and/or estimate one or more of the following user-specific features (e.g., utilizing CB-1 and/or CB-2 and/or PB-5): the total time of each movement or stroke; the Straightness (e.g. ratio between total length of stroke to the direct path or the smoothed path); Stroke length; Pause since previous stroke; Bounding rectangle long side; Bounding rectangle short side; Bounding rectangle area; Bounding rectangle ratio of short to long sides; Linear motor control model for X axis; Linear motor control model for Y axis; the stroke's starting direction with regard to the stroke's direction; The stroke's ending direction with regard to the stroke's direction; Average speed in direction of stroke; Average speed perpendicular to direction of stroke; Average starting speed; Average starting absolute acceleration; Average end speed; Average end absolute acceleration; Average starting curvature; Average end curvature; Ratio between total length of stroke to the direct path (non-smoothed); Median noise (difference between actual path and smoothed path). Other user-specific parameters may be estimated or calculated; for example, related to the rotated path in direction of the stroke, and/or related to the rotated path perpendicular to the direction of the stroke. The linear motor control model for X axis, and for the Y axis, may be calculates as:

$$a_x = \alpha \cdot v_x + \beta \cdot (x - x_{end}) \quad (6)$$

$$a_y = \alpha \cdot v_y + \beta \cdot (y - y_{end}) \quad (7)$$

Some embodiments of the present invention may be utilized in order to differentiate or distinguish between: an authorized user versus an unauthorized user; a genuine user versus an imposter or fraudster or hacker; a human user versus an automatic script or malware or "bot"; a local user (e.g., operating a local computing device) versus a remote user (authorized, or non-authorized attacker) utilizing a remote access terminal (or a remote access malware); a first authorized user and a second authorized user (e.g., husband and wife accessing a joint bank account; or two managers or business partners accessing a business bank account); a first authorized user and a second, unauthorized, user (e.g., a parent accessing a bank account; and a son or daughter using the banking website after the parent has left the computing device without logging-out); and/or for other user identity detection purposes, user identity verification purposes, user authentication purposes, security purposes, fraud detection purposes, fraud mitigation purposes, or the like.

The terms "mobile device" or "mobile electronic device" as used herein may include, for example, a smartphone, a cellular phone, a mobile phone, a tablet, a handheld device, a portable electronic device, a portable gaming device, a portable audio/video player, or the like.

The term "pointing device" as used herein may include, for example, a mouse, a trackball, a pointing stick, a stylus, a joystick, a motion-sensing input device, a touch screen, a touch-pad, or the like.

The term "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, or the like.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

In some embodiments, the present invention may be utilized to decrease (or increase, or modify) friction from an authentication process. For example, after a login form was filled and submitted by the user, a demonstrative system may skip or not skip an additional authentication step (e.g., a security question) if the system recognizes the user as the genuine user.

In some embodiments, the present invention may be utilized to increase (or decrease, or modify) the system's tolerance for mistakes (or failed attempts) made by the user in an authentication process. For example, a demonstrative system may allow three consecutive failed attempts in logging-in, and may then "lock" the account and may require that the user (e.g., a bank customer) to call a customer service number for further handling. However, if the present invention is utilized, some embodiments may recognize that although three failed log-in attempts were performed, they were all performed in a GUI-utilization manner that closely matches the previously-stored user-specific profile of GUI utilization; and therefore, the system may become more "forgiving" and may allow such user one more (or a few more) log-in attempts before "locking" the account or putting the process on hold.

In some embodiments, the system may periodically update the user-specific GUI-utilization profile, based on the ongoing utilization by the user. For example, the user may start utilizing the system on January 1st, and the system may utilize ten log-in sessions, performed in January, for generating an initial user-specific profile of GUI utilization. The system may proceed to utilize the generated profile, during 25 subsequent log-in profiles of that user, in the months of February through June. The system may continue to update the user-specific profile, based on log-in sessions as they take place. Optionally, the system may discard historic data of GUI-utilization (e.g., in a First-In-First-Out (FIFO) order), since, for example, a user may change the way of utilizing the GUI over time, due to learning the system better, becoming more familiar with the system, getting older in age, or the like. In some embodiments, the system may continuously update the user-specific profile of GUI utilization.

Some embodiments of the present invention may be utilized, or may operate, in conjunction with methods, algorithms, devices and/or systems which are described in U.S. patent application Ser. No. 13/877,676, titled "Method and Device for Confirming Computer End-User Identity", published on Sep. 12, 2013 as United States patent application publication number 2013/0239195, which is hereby incorporated by reference in its entirety.

Some embodiments of the present invention may be utilized, or may operate, in conjunction with methods, algorithms, devices and/or systems which are described in U.S. patent application Ser. No. 13/922,271, titled "System. Device, and Method of Detecting Identity of a User of a Mobile Electronic Device", filed on Jun. 20, 2013, published as United States patent application publication number 2013/0288647, which is hereby incorporated by reference in its entirety.

In some embodiments of the present invention, a method comprises: during a first session of a user who utilizes a pointing device for interacting with a computerized service, monitoring the pointing device dynamics and gestures of said user; based on the monitored dynamics and gestures, estimating parameters that characterize a sensorimotor control loop model of said user.

In some embodiments, the method comprises: storing in a database a record indicating that said user is associated with said parameters that characterize the sensorimotor control loop model of said user.

In some embodiments, the method comprises, in a subsequent session of interaction with said computerized service: monitoring pointing device dynamics and gestures of a subsequent user; estimating current parameters that characterize a sensorimotor control loop of said subsequent user; comparing the current parameters to said record of parameters, and based on results of said comparing, determining whether said subsequent user of the second session is the same person as said user of the first session.

In some embodiments, the method comprises, in a subsequent session of interaction with said computerized service: monitoring pointing device gestures of a subsequent user; estimating current parameters that characterize a sensorimotor control loop of said subsequent user; comparing the current parameters to said record of parameters, and based on results of said comparing, determining whether to authenticate identity of said subsequent user.

In some embodiments, estimating parameters of a motor control loop of said user comprises: estimating the parameters that characterize the sensorimotor control loop as a function of translation error, current velocity, and motor control noise, based on monitored pointing device dynamics and gestures.

In some embodiments, estimating parameters of a motor control loop of said user comprises: estimating a linear control loop model as a linear function of translation error, current velocity, and motor control noise, based on monitored pointing device dynamics and gestures.

In some embodiments, the method comprises: estimating parameters of a first sensorimotor control loop, associated with pointing device based interaction of a first user during a first session at said computerized service; estimating parameters of a second sensorimotor control loop, associated with pointing device based interaction of a second user during a second session at said computerized service; if the parameters of the first sensorimotor control loop match the parameters of the second sensorimotor control loop, then determining that the first user and the second user are the same person.

In some embodiments, the method comprises: estimating parameters of a first sensorimotor control loop, associated with pointing device based interaction of a first user during a first session at a first computerized service; estimating parameters of a second sensorimotor control loop, associated with pointing device based interaction of a second user during a second session at a second, different, computerized service; if the parameters of the first sensorimotor control loop match the parameters of the second sensorimotor control loop, then determining that the first user and the second user are the same person.

In some embodiments, estimating the parameters of the sensorimotor control loop comprises: estimating parameters of a sensorimotor control loop which comprises sensory organ, muscle, and brain.

In some embodiments, estimating the parameters of the sensorimotor control loop comprises: estimating parameters of a sensorimotor control loop which comprises eye, hand, and brain coordination and control of the pointing device.

In some embodiments, the method comprises: estimating a first user-specific biometric feature corresponding to a first motor control loop of said user across an x-axis; estimating a second user-specific biometric feature corresponding to a second motor control loop of said user across a y-axis.

In some embodiments, the method comprises: estimating a third user-specific biometric feature by calculating a statistics function, applied to one of said first and second motor control loops; wherein the statistics function is selected from the group consisting of: mean, standard deviation, range, maximum, minimum, kurtosis, skewness, quantiles.

In some embodiments, the method comprises: estimating a first user-specific biometric feature corresponding to a motor control loop of said user across a combination of x-axis and y-axis.

In some embodiments, the method comprises: estimating a user-specific muscular profile which characterizes the motor control loop; estimating a user-specific coordination index which characterizes the motor control loop; differentiating between two or more users based on the user-specific muscular profile and the user-specific coordination index.

In some embodiments, the method comprises: based on the monitored pointing device dynamics and gestures of said user, estimating a length of an arm of said user; based on the estimated length of arm of said user, differentiating between said user and another user interacting with said computerized service.

In some embodiments, the method comprises: based on the monitored pointing device dynamics and gestures of said user, estimating a length of a wrist of said user; based on the estimated length of wrist of said user, differentiating between said user and another user interacting with said computerized service.

In some embodiments, the method comprises: based on the monitored pointing device dynamics and gestures of said user, estimating a range of a wrist of said user; based on the estimated range of wrist of said user, differentiating between said user and another user interacting with said computerized service.

In some embodiments, the method comprises: based on the monitored pointing device dynamics and gestures of said user, estimating level of flexibility of movement of a wrist of said user; based on the estimated level of flexibility of movement of wrist of said user, differentiating between said user and another user interacting with said computerized service.

In some embodiments, the method comprises: based on the monitored pointing device dynamics and gestures of said user, estimating movement agility of said user; based on the estimated movement agility of said user, differentiating between said user and another user interacting with said computerized service.

In some embodiments, the method comprises: based on the monitored pointing device dynamics and gestures of said user, estimating movement dexterity of said user; based on the estimated movement dexterity of said user, differentiating between said user and another user interacting with said computerized service.

In some embodiments, the method comprises: based on the monitored pointing device dynamics and gestures of said user, estimating a movement range of fingers of said user; based on the estimated movement range of fingers of said user, differentiating between said user and another user interacting with said computerized service.

In some embodiments, the method comprises: based on the monitored pointing device dynamics and gestures of said user, estimating a movement range of a mouse-wheel operating finger of said user; based on the estimated movement range of the mouse-wheel operating finger of said user, differentiating between said user and another user interacting with said computerized service.

In some embodiments, the method comprises: based on the monitored pointing device dynamics and gestures of said user, estimating whether or not an elbow of said user is resting on a surface; based on estimation of whether or not the elbow of said user is resting on the surface, differentiating between said user and another user interacting with said computerized service.

In some embodiments, the method comprises: based on the monitored pointing device dynamics and gestures of said user, estimating whether the user is right-handed; based on estimation of whether said user is right-handed, differentiating between said user and another user interacting with said computerized service.

In some embodiments, the method comprises: based on the monitored pointing device dynamics and gestures of said user, estimating whether the user is left-handed; based on estimation of whether said user is left-handed, differentiating between said user and another user interacting with said computerized service.

In some embodiments, the method comprises: based on the monitored pointing device dynamics and gestures of said user, estimating one or more parameters characterizing an eye-hand cognitive correction feedback of said user; based on the estimated one or more parameters characterizing the eye-hand cognitive correction feedback of said user, differentiating between said user and another user interacting with said computerized service.

In some embodiments, the method comprises: based on the monitored pointing device dynamics and gestures of said user, estimating a level of accuracy of said user in reaching an on-screen user interface element; based on the estimated level of accuracy of said user, differentiating between said user and another user interacting with said computerized service.

In some embodiments, the method comprises: based on the monitored pointing device dynamics and gestures of said user, estimating an eye saccade model of said user; based on the estimated eye saccade model of said user, differentiating between said user and another user interacting with said computerized service.

In some embodiments, the method comprises: based on the monitored pointing device dynamics and gestures of said user, estimating a smooth pursuit movement model of said user; based on the estimated smooth pursuit movement model of said user, differentiating between said user and another user interacting with said computerized service.

In some embodiments, the method comprises: based on the monitored pointing device dynamics and gestures of said user, estimating an eye-hand coordination model of said user in response to an introduced interference to user experience at said computerized service; based on the estimated eye-hand coordination model of said user in response to the introduced interference to user experience at said computerized service, differentiating between said user and another user interacting with said computerized service.

In some embodiments, the method comprises: based on the monitored pointing device dynamics and gestures of said user, estimating a level of awareness of said user to a freshly-loaded page of said computerized service; based on the estimated level of awareness of said user, differentiating between said user and another user interacting with said computerized service.

In some embodiments, the method comprises: based on the monitored pointing device dynamics and gestures of said user, estimating a level of awareness of said user to a freshly-modified non-reloaded page of said computerized service; based on the estimated level of awareness of said user, differentiating between said user and another user interacting with said computerized service.

In some embodiments, the method comprises: based on the monitored pointing device dynamics and gestures of said user, estimating a level of awareness of said user to a modification in one or more user interface elements of said computerized service; based on the estimated level of awareness of said user, differentiating between said user and another user interacting with said computerized service.

In some embodiments, the method comprises: presenting to said user a number of choices; subsequently, modifying the number of choices presented to said user; based on the monitored pointing device dynamics and gestures of said user, estimating a level of awareness of said user to modification of the number of choices; based on the estimated level of awareness of said user, differentiating between said user and another user interacting with said computerized service.

In some embodiments, the method comprises: based on the monitored pointing device dynamics and gestures of said user, estimating parameters of a Fitts's Law function indicating ability of said user to rapidly reach an on-screen target; based on the estimated parameters of the Fitts's Law function of said user, differentiating between said user and another user interacting with said computerized service.

In some embodiments, the method comprises: a monitoring module configured to operate during a first session of a user who utilizes a pointing device for interacting with a computerized service, wherein the monitoring module is to monitor the pointing device dynamics and gestures of said user; a motor control loop model estimator, to estimate, based on the monitored dynamics and gestures, parameters that characterize a sensorimotor control loop model of said user.

In some embodiments, the method comprises: a database to store a record indicating that said user is associated with said parameters that characterize the sensorimotor control loop model of said user; wherein, in a subsequent session of interaction with said computerized service, the monitoring module is to monitor pointing device dynamics and gestures of a subsequent user, wherein the motor control loop model estimator is to estimate current parameters that characterize a sensorimotor control loop of said subsequent user; wherein the system comprises a comparator to compare the current parameters to said record of parameters, and based on comparison results, to determine whether said subsequent user of the second session is the same person as said user of the first session.

In some embodiments, a method comprises: during a first session of a user, who utilizes a pointing device and a keyboard for interacting with a computerized service, monitoring pointing device dynamics and gestures and keystrokes of said user; analyzing the monitored pointing device dynamics and gestures and keystrokes, in relation to (a) state and context of said computerized service, and (b) user interface elements displayed by said computerized service; generating a user-specific biometric trait indicating a user-specific service usage pattern, which comprises at least one of: a user-specific inter-application usage pattern, and a user-specific intra-application usage pattern.

In some embodiments, the method comprises: monitoring whether said user more frequently utilizes the pointing device or the keyboard in order to perform a particular type of interaction with said computerized service; based on said monitoring, generating a user-specific intra-application usage pattern associated with said user.

In some embodiments, the method comprises: monitoring whether said user more frequently utilizes the pointing device or the keyboard in order to submit a form at said computerized service; based on said monitoring, generating a user-specific intra-application usage pattern associated with said user.

In some embodiments, the method comprises: monitoring whether said user more frequently utilizes the pointing device or the keyboard in order to fill-in data in a form at said computerized service; based on said monitoring, generating a user-specific intra-application usage pattern associated with said user.

In some embodiments, the method comprises: monitoring whether said user more frequently utilizes the pointing device or the keyboard in order to move a cursor between fields at said computerized service; based on said monitoring, generating a user-specific intra-application usage pattern associated with said user.

In some embodiments, the method comprises: monitoring whether said user more frequently utilizes the pointing device or the keyboard in order to paste data into a particular field at said computerized service; based on said monitoring, generating a user-specific intra-application usage pattern associated with said user.

In some embodiments, the method comprises: monitoring whether said user more frequently (a) pastes data into a particular field at said computerized service, or (b) types data into said particular field at said computerized service; based on said monitoring, generating a user-specific intra-application usage pattern associated with said user.

In some embodiments, the method comprises: determining a user-specific inter-application usage pattern that indicates that said user, in most of its interactions with said computerized service, performs a first particular action prior to performing a second particular action; based on said user-specific inter-application usage pattern, determining whether a subsequent user of said computerizes service is the same person as said user.

In some embodiments, the method comprises: determining a user-specific inter-application usage pattern that indicates that said user, in most of its interactions with said computerized service, visits a first particular page of said computerized service prior to visiting a second particular page of said computerized service; based on said user-specific inter-application usage pattern, determining whether a subsequent user of said computerizes service is the same person as said user.

In some embodiments, the method comprises: determining a user-specific inter-application usage pattern that indicates that said user, in most of its interactions with said computerized service, spends a first period of time at a first particular page of said computerized service prior to spending a second period of time at a second particular page of said computerized service; based on said user-specific inter-application usage pattern, determining whether a subsequent user of said computerizes service is the same person as said user.

In some embodiments, the method comprises: monitoring for each field in a computerize service, mouse dynamics and gestures for that field; based on said monitoring, generating a user-specific field-usage pattern associated with said user.

In some embodiments, the method comprises: monitoring for each field in a computerize service, (a) a mouse angle of approach to the field, (b) a mouse angle of exit from the field, (c) velocities of mouse approach and mouse exit, (d) time period spent within the field, and (e) location of a mouse click event within the field; based on said monitoring, generating a user-specific field-usage pattern associated with said user.

In some embodiments, the method comprises: based on monitored pointing device dynamics and gestures and based on monitored keystrokes of said user, estimating a user-specific behavioral trait of page-usage stream pattern of said user; based on the estimated user-specific behavioral trait of page-usage stream pattern of said user, differentiating between said user and another user interacting with said computerized service.

In some embodiments, the method comprises: based on monitored pointing device dynamics and gestures and based on monitored keystrokes of said user, estimating a user-specific behavioral trait of multiple-field-usage stream pattern of said user in relation to multiple fields on a particular page of said computerized service; based on the estimated user-specific behavioral trait of multiple-field-usage stream pattern of said user, differentiating between said user and another user interacting with said computerized service.

In some embodiments, the method comprises: based on monitored pointing device dynamics and gestures of said user, estimating a user-specific behavioral trait corresponding to angle of approach by said user to an on-screen field of said computerized service; based on the estimated user-specific behavioral trait of angle of approach of said user, differentiating between said user and another user interacting with said computerized service.

In some embodiments, the method comprises: based on monitored pointing device dynamics and gestures of said user, estimating a user-specific behavioral trait corresponding to angle of exit by said user from an on-screen field of said computerized service; based on the estimated user-specific behavioral trait of angle of exit of said user, differentiating between said user and another user interacting with said computerized service.

In some embodiments, the method comprises: based on monitored pointing device dynamics and gestures of said user, estimating a user-specific behavioral trait corresponding to speed of approach by said user to an on-screen field of said computerized service; based on the estimated user-specific behavioral trait of speed of approach of said user, differentiating between said user and another user interacting with said computerized service.

In some embodiments, the method comprises: based on monitored pointing device dynamics and gestures of said user, estimating a user-specific behavioral trait corresponding to speed of exit by said user from an on-screen field of said computerized service; based on the estimated user-specific behavioral trait of speed of exit of said user, differentiating between said user and another user interacting with said computerized service.

In some embodiments, the method comprises: based on monitored pointing device dynamics and gestures of said user, estimating a user-specific behavioral trait corresponding to acceleration of approach by said user to an on-screen field of said computerized service; based on the estimated user-specific behavioral trait of acceleration of approach of said user, differentiating between said user and another user interacting with said computerized service.

In some embodiments, the method comprises: based on monitored pointing device dynamics and gestures of said user, estimating a user-specific behavioral trait corresponding to acceleration of exit by said user from an on-screen field of said computerized service; based on the estimated user-specific behavioral trait of acceleration of exit of said user, differentiating between said user and another user interacting with said computerized service.

In some embodiments, the method comprises: based on monitored pointing device dynamics and gestures of said user, estimating a user-specific behavioral trait corresponding to jerk of approach by said user to an on-screen field of said computerized service; based on the estimated user-specific behavioral trait of jerk of approach of said user, differentiating between said user and another user interacting with said computerized service.

In some embodiments, the method comprises: based on monitored pointing device dynamics and gestures of said user, estimating a user-specific behavioral trait corresponding to jerk of exit by said user from an on-screen field of said computerized service; based on the estimated user-specific behavioral trait of jerk of exit of said user, differentiating between said user and another user interacting with said computerized service.

In some embodiments, the method comprises: based on monitored pointing device dynamics and gestures of said user, estimating whether said user typically clicks with said pointing device (i) at a center region of a particular user interface element of said computerized service, or (ii) at a right-side region of said particular user interface element of said computerized service, or (iii) at a left-side region of said particular user interface element of said computerized service; based on estimation of whether said user typically clicks at said center region, at said right-side region, or at said left-side region, of said particular user interface element of said computerized service, differentiating between said user and another user interacting with said computerized service.

In some embodiments, the method comprises: based on monitored pointing device dynamics and gestures of said user and based on monitored keystrokes of said user, estimating a time period that is typically required for said user in order to move an on-screen pointer from a first particular field to a second particular field of said computerized service; based on estimation of said time period, that is typically required for said user in order to move an on-screen pointer from a first particular field to a second particular field of said computerized service, differentiating between said user and another user interacting with said computerized service.

In some embodiments, the method comprises: based on monitored pointing device dynamics and gestures of said user and based on monitored keystrokes of said user, estimating a time period that is typically required for said user in order to proceed from (i) a click within a particular field of said computerized service, to (ii) typing within said particular field of said computerized service; based on estimation of said time period, that is typically required for said user in order to proceed from (i) click within said particular field of said computerized service, to (ii) typing within said particular field of said computerized service, differentiating between said user and another user interacting with said computerized service.

In some embodiments, the method comprises: based on monitored pointing device dynamics and gestures of said user and based on monitored keystrokes of said user, estimating a time period that is typically required for said user in order to proceed from (i) end of typing within a particular field of said computerized service, to (ii) moving an on-screen pointer away from said particular field of said computerized service; based on estimation of said time period, that is typically required for said user in order to proceed from (i) end of typing within said particular field of said computerized service, to (ii) moving an on-screen pointer away from said particular field of said computerized service, differentiating between said user and another user interacting with said computerized service.

In some embodiments, the method comprises: based on monitored pointing device dynamics and gestures of said user and based on monitored keystrokes of said user, estimating whether said user typically scrolls a page of said computerized service (i) using a mouse, or (ii) using a keyboard; based on estimation of whether said user typically scrolls a page of said computerized service (i) using a mouse, or (ii) using a keyboard, differentiating between said user and another user interacting with said computerized service.

In some embodiments, the method comprises: based on monitored pointing device dynamics and gestures of said user, estimating whether said user typically scrolls a page of said computerized service (i) using mouse-clicks on an on-screen scroll-bar, or (ii) using mouse-wheel; based on estimation of whether said user typically scrolls a page of said computerized service (i) using mouse-clicks on an on-screen scroll-bar, or (ii) using mouse-wheel, differentiating between said user and another user interacting with said computerized service.

In some embodiments, the method comprises: based on monitored keystrokes of said user, estimating whether said user typically scrolls a page of said computerized service (i) using arrow-down and arrow-up keys, or (ii) using page-up and page-down keys; based on estimation of whether said user typically scrolls a page of said computerized service (i) using arrow-down and arrow-up keys, or (ii) using page-up and page-down keys, differentiating between said user and another user interacting with said computerized service.

In some embodiments, the method comprises: based on monitored pointing device dynamics and gestures of said user, estimating an average pointing device movement speed of said user; based on estimation of average pointing device movement speed of said user, differentiating between said user and another user interacting with said computerized service.

In some embodiments, the method comprises: based on monitored pointing device dynamics and gestures of said user, estimating a standard deviation of pointing device movement speed of said user; based on estimation of standard deviation of pointing device movement speed of said user, differentiating between said user and another user interacting with said computerized service.

In some embodiments, the method comprises: based on monitored pointing device dynamics and gestures of said user, estimating a distribution of pointing device movement speed of said user; based on estimation of distribution of pointing device movement speed of said user, differentiating between said user and another user interacting with said computerized service.

In some embodiments, the method comprises: based on monitored pointing device dynamics and gestures of said user, estimating an average of positive values of acceleration of pointing device movement of said user in a particular direction; based on estimation of said average of positive values of acceleration, differentiating between said user and another user interacting with said computerized service.

In some embodiments, the method comprises: based on monitored pointing device dynamics and gestures of said user, estimating an average of negative values of acceleration of pointing device movement of said user in a particular direction; based on estimation of said average of negative values of acceleration, differentiating between said user and another user interacting with said computerized service.

In some embodiments, the method comprises: based on monitored pointing device dynamics and gestures of said user, estimating a standard deviation of acceleration of pointing device movement of said user in a particular direction; based on estimation of said standard deviation of acceleration, differentiating between said user and another user interacting with said computerized service.

In some embodiments, the method comprises: based on monitored pointing device dynamics and gestures of said user, estimating a ratio between (i) a number of positive values of acceleration in a direction of movement, and (ii) a number of negative values of acceleration in said direction of movement; based on estimation of said ratio, differentiating between said user and another user interacting with said computerized service.

In some embodiments, the method comprises: based on monitored pointing device dynamics and gestures of said user, estimating an average of positive values of acceleration of pointing device movement of said user in a direction perpendicular to a direction of movement of said pointing device; based on estimation of said average of positive values of acceleration, differentiating between said user and another user interacting with said computerized service.

In some embodiments, the method comprises: based on monitored pointing device dynamics and gestures of said user, estimating an average of negative values of acceleration of pointing device movement of said user in a direction perpendicular to a direction of movement of said pointing device; based on estimation of said average of negative values of acceleration, differentiating between said user and another user interacting with said computerized service.

In some embodiments, the method comprises: based on monitored pointing device dynamics and gestures of said user, estimating a median of absolute values of angular velocity of pointing device movement of said user; based on estimation of median of absolute values of angular velocity of pointing device movement of said user, differentiating between said user and another user interacting with said computerized service.

In some embodiments, the method comprises: based on monitored pointing device dynamics and gestures of said user, estimating a distribution of angular velocity of pointing device movement of said user; based on estimation of distribution of angular velocity of pointing device movement of said user, differentiating between said user and another user interacting with said computerized service.

In some embodiments, the method comprises: based on monitored pointing device dynamics and gestures of said user, estimating a median speed of movement at a click event of said pointing device of said user; based on estimation of median speed of movement at a click event of said pointing device of said user, differentiating between said user and another user interacting with said computerized service.

In some embodiments, the method comprises: based on monitored pointing device dynamics and gestures of said user, estimating an average of time difference between a mouseclick-down event and a mouseclick-up event of said pointing device of said user; based on estimation of average of time difference between a mouseclick-down event and a mouseclick-up event of said pointing device of said user, differentiating between said user and another user interacting with said computerized service.

In some embodiments, the method comprises: based on monitored pointing device dynamics and gestures of said user, estimating an average direction of pre-mouseclick movements of said pointing device of said user; based on estimation of average direction of pre-mouseclick movements of said pointing device of said user, differentiating between said user and another user interacting with said computerized service.

In some embodiments, the method comprises: based on monitored pointing device dynamics and gestures of said user, estimating a ratio between (i) mouse movement events of said user, to (ii) all mouse events of said user; based on estimation of said ratio between (i) mouse movement events of said user, to (ii) all mouse events of said user, differentiating between said user and another user interacting with said computerized service.

In some embodiments, the method comprises: based on monitored pointing device dynamics and gestures of said user, estimating a ratio between (i) mouse click events of said user, to (ii) all mouse events of said user; based on estimation of said ratio between (i) mouse click events of said user, to (ii) all mouse events of said user, differentiating between said user and another user interacting with said computerized service.

In some embodiments, the method comprises: based on monitored pointing device dynamics and gestures of said user, estimating a ratio between (i) mouse wheel events of said user, to (ii) all mouse events of said user; based on estimation of said ratio between (i) mouse wheel events of said user, to (ii) all mouse events of said user, differentiating between said user and another user interacting with said computerized service.

In some embodiments, the method comprises: based on monitored pointing device dynamics and gestures of said user, estimating a ratio between (i) sharp mouse movements of said user, to (ii) all mouse movements of said user; based on estimation of said ratio between (i) sharp mouse movements of said user, to (ii) all mouse movements of said user, differentiating between said user and another user interacting with said computerized service.

In some embodiments, a system comprises: a monitoring module operative during a first session of a user, who utilizes a pointing device and a keyboard for interacting with a computerized service, wherein the monitoring module is to monitor pointing device dynamics and gestures and keystrokes of said user; an analysis module (i) to analyze the monitored pointing device dynamics and gestures and keystrokes, in relation to (a) state and context of said computerized service, and (b) user interface elements displayed by said computerized service, and (ii) to generate a user-specific biometric trait indicating a user-specific service usage pattern, which comprises at least one of: a user-specific inter-application usage pattern, and a user-specific intra-application usage pattern.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
    (A) during multiple usage sessions of multiple users with a particular computerized financial service, wherein each one of said users utilizes a pointing device and a keyboard for interacting with said particular computerized service, monitoring pointing device dynamics and gestures and keystrokes of each one of said users across multiple different pages of said particular computerized financial service;
    (B) differentiating between (i) a legitimate user of said particular computerized financial service, and (ii) an illegitimate user of said particular computerized financial service, based on an aggregate combination of:
        (I) a first unique sequence in which each user visits multiple web-pages of said particular financial computerized service, and
        (II) a second unique sequence in which each user engages with on-screen user interface (UI) elements within a single web-page of said particular computerized financial service, and
        (III) a unique transition pattern in which each user transitions from a first on-screen component of a first web-page to a second on-screen component of a second web-page of said particular computerized financial service;
    (C) based on said differentiating, flagging a particular financial transaction of a particular user of said particular computerized financial service as possibly-fraudulent.

2. The method of claim 1, comprising:
monitoring whether said user more frequently utilizes the pointing device or the keyboard in order to perform a particular type of interaction with said particular computerized financial service;
based on said monitoring, generating a user-specific intra-application usage pattern associated with said user.

3. The method of claim 1, comprising:
based on analysis of user interactions, determining whether (A) said user utilizes the pointing device more frequently than the keyboard in order to submit a format said particular computerized financial service;
based on said monitoring, generating a user-specific intra-application usage pattern associated with said user.

4. The method of claim 1, comprising:
monitoring whether said user more frequently utilizes the pointing device or the keyboard in order to fill-in data in a form at said particular computerized financial service;
based on said monitoring, generating a user-specific intra-application usage pattern associated with said user.

5. The method of claim 1, comprising:
monitoring whether said user more frequently utilizes the pointing device or the keyboard in order to move a cursor between fields at said particular computerized financial service;
based on said monitoring, generating a user-specific intra-application usage pattern associated with said user.

6. The method of claim 1, comprising:
monitoring whether said user more frequently utilizes the pointing device or the keyboard in order to paste data into a particular field at said particular computerized financial service;
based on said monitoring, generating a user-specific intra-application usage pattern associated with said user.

7. The method of claim 1, comprising:
monitoring whether said user more frequently (a) pastes data into a particular field at said particular computerized financial service, or (b) types data into said particular field at said particular computerized financial service;
based on said monitoring, generating a user-specific intra-application usage pattern associated with said user.

8. The method of claim 1, comprising:
determining a user-specific inter-application usage pattern that indicates that said user, in most of its interactions with said particular computerized financial service, performs a first particular action prior to performing a second particular action;
based on said user-specific inter-application usage pattern, determining whether a subsequent user of said particular computerized financial service is the same person as said user.

9. The method of claim 1, comprising:
determining a user-specific inter-application usage pattern that indicates that said user, in most of its interactions with said particular computerized financial service, spends a first period of time at a first particular page of said particular computerized financial service prior to spending a second period of time at a second particular page of said particular computerized financial service;
based on said user-specific inter-application usage pattern, determining whether a subsequent user of said particular computerized financial service is the same person as said user.

10. The method of claim 1, comprising:
monitoring for each field in a said particular computerized financial service, mouse dynamics and gestures for that field;
based on said monitoring, generating a user-specific field-usage pattern associated with said user and with said financial service.

11. The method of claim 1, comprising:
monitoring for each field in said particular computerized financial service, (a) a mouse angle of approach to the field, (b) a mouse angle of exit from the field, (c) velocities of mouse approach and mouse exit, (d) time period spent within the field, and (e) location of a mouse click event within the field;
based on said monitoring, generating a user-specific field-usage pattern associated with said user.

12. The method of claim 1, comprising:
based on monitored pointing device dynamics and gestures and based on monitored keystrokes of said user, estimating a user-specific behavioral trait of multiple-field-usage stream pattern of said user in relation to multiple fields on a particular page of said particular computerized financial service;
based on the estimated user-specific behavioral trait of multiple-field-usage stream pattern of said user, differentiating between said user and another user interacting with said particular computerized financial service.

13. The method of claim 1, comprising:
based on monitored pointing device dynamics and gestures of said user, estimating a user-specific behavioral trait corresponding to angle of approach by said user to an on-screen field of said particular computerized financial service;
based on the estimated user-specific behavioral trait of angle of approach of said user, differentiating between said user and another user interacting with said particular computerized financial service.

14. The method of claim 1, comprising:
based on monitored pointing device dynamics and gestures of said user, estimating a user-specific behavioral trait corresponding to angle of exit by said user from an on-screen field of said particular computerized financial service;
based on the estimated user-specific behavioral trait of angle of exit of said user, differentiating between said user and another user interacting with said particular computerized financial service.

15. The method of claim 1, comprising:
based on monitored pointing device dynamics and gestures of said user, estimating a user-specific behavioral trait corresponding to speed of approach by said user to an on-screen field of said particular computerized financial service;
based on the estimated user-specific behavioral trait of speed of approach of said user, differentiating between said user and another user interacting with said particular computerized financial service.

16. The method of claim 1, comprising:
based on monitored pointing device dynamics and gestures of said user, estimating a user-specific behavioral trait corresponding to speed of exit by said user from an on-screen field of said particular computerized financial service;
based on the estimated user-specific behavioral trait of speed of exit of said user, differentiating between said user and another user interacting with said particular computerized financial service.

17. The method of claim 1, comprising:
based on monitored pointing device dynamics and gestures of said user, estimating a user-specific behavioral trait corresponding to acceleration of approach by said user to an on-screen field of said particular computerized financial service;
based on the estimated user-specific behavioral trait of acceleration of approach of said user, differentiating between said user and another user interacting with said particular computerized financial service.

18. The method of claim 1, comprising:
based on monitored pointing device dynamics and gestures of said user, estimating a user-specific behavioral trait corresponding to acceleration of exit by said user from an on-screen field of said particular computerized financial service;
based on the estimated user-specific behavioral trait of acceleration of exit of said user, differentiating between said user and another user interacting with said particular computerized financial service.

19. The method of claim 1, comprising:
based on monitored pointing device dynamics and gestures of said user and based on monitored keystrokes of said user, estimating a time period that is typically required for said user in order to move an on-screen pointer from a first particular field to a second particular field of said particular computerized financial service;
based on estimation of said time period, that is typically required for said user in order to move an on-screen pointer from a first particular field to a second particular field of said computerized service, differentiating between said user and another user interacting with said particular computerized financial service.

20. The method of claim 1, comprising:
based on monitored pointing device dynamics and gestures of said user and based on monitored keystrokes of said user, estimating a time period that is typically required for said user in order to proceed from (i) a click within a particular field of said particular computerized financial service, to (ii) typing within said particular field of said particular computerized financial service;
based on estimation of said time period, that is typically required for said user in order to proceed from (i) click within said particular field of said particular computerized financial service, to (ii) typing within said particular field of said particular computerized financial service, differentiating between said user and another user interacting with said particular computerized financial service.

21. The method of claim 1, comprising:
based on monitored pointing device dynamics and gestures of said user and based on monitored keystrokes of said user, estimating a time period that is typically required for said user in order to proceed from (i) end of typing within a particular field of said particular computerized financial service, to (ii) moving an on-screen pointer away from said particular field of said particular computerized financial service;
based on estimation of said time period, that is typically required for said user in order to proceed from (i) end of typing within said particular field of said particular computerized financial service, to (ii) moving an on-screen pointer away from said particular field of said particular computerized financial service, differentiating between said user and another user interacting with said particular computerized financial service.

22. The method of claim 1, comprising:
based on monitored pointing device dynamics and gestures of said user and based on monitored keystrokes of said user, estimating whether said user typically scrolls a page of said particular computerized financial service (i) using a mouse, or (ii) using a keyboard;
based on estimation of whether said user typically scrolls a page of said particular computerized financial service (i) using a mouse, or (ii) using a keyboard, differentiating between said user and another user interacting with said particular computerized financial service.

23. The method of claim 1, comprising:
based on monitored pointing device dynamics and gestures of said user, estimating whether said user typically scrolls a page of said particular computerized financial service (i) using mouse-clicks on an on-screen scroll-bar, or (ii) using mouse-wheel;
based on estimation of whether said user typically scrolls a page of said particular computerized financial service (i) using mouse-clicks on an on-screen scroll-bar, or (ii) using mouse-wheel, differentiating between said user and another user interacting with said particular computerized financial service.

24. The method of claim 1, comprising:
based on monitored keystrokes of said user, estimating whether said user typically scrolls a page of said particular computerized financial service (i) using arrow-down and arrow-up keys, or (ii) using page-up and page-down keys;
based on estimation of whether said user typically scrolls a page of said particular computerized financial service (i) using arrow-down and arrow-up keys, or (ii) using page-up and page-down keys, differentiating between said user and another user interacting with said particular computerized financial service.

25. The method of claim 1, comprising:
based on monitored pointing device dynamics and gestures of said user, estimating an average pointing device movement speed of said user;
based on estimation of average pointing device movement speed of said user, differentiating between said user and another user interacting with said particular computerized financial service.

26. The method of claim 1, comprising:
based on monitored pointing device dynamics and gestures of said user, estimating a standard deviation of pointing device movement speed of said user;
based on estimation of standard deviation of pointing device movement speed of said user, differentiating between said user and another user interacting with said particular computerized financial service.

27. The method of claim 1, comprising:
based on monitored pointing device dynamics and gestures of said user, estimating a distribution of pointing device movement speed of said user;
based on estimation of distribution of pointing device movement speed of said user, differentiating between said user and another user interacting with said particular computerized financial service.

28. The method of claim 1, comprising:
based on monitored pointing device dynamics and gestures of said user, estimating an average of positive values of acceleration of pointing device movement of said user in a particular direction;

based on estimation of said average of positive values of acceleration, differentiating between said user and another user interacting with said particular computerized financial service.

29. The method of claim 1, comprising:
based on monitored pointing device dynamics and gestures of said user, estimating an average of negative values of acceleration of pointing device movement of said user in a particular direction;
based on estimation of said average of negative values of acceleration, differentiating between said user and another user interacting with said particular computerized financial service.

30. The method of claim 1, comprising:
based on monitored pointing device dynamics and gestures of said user, estimating a standard deviation of acceleration of pointing device movement of said user in a particular direction;
based on estimation of said standard deviation of acceleration, differentiating between said user and another user interacting with said particular computerized financial service.

31. The method of claim 1, comprising:
based on monitored pointing device dynamics and gestures of said user, estimating a ratio between (i) a number of positive values of acceleration in a direction of movement, and (ii) a number of negative values of acceleration in said direction of movement;
based on estimation of said ratio, differentiating between said user and another user interacting with said particular computerized financial service.

32. The method of claim 1, comprising:
based on monitored pointing device dynamics and gestures of said user, estimating an average of positive values of acceleration of pointing device movement of said user in a direction perpendicular to a direction of movement of said pointing device;
based on estimation of said average of positive values of acceleration, differentiating between said user and another user interacting with said particular computerized financial service.

33. The method of claim 1, comprising:
based on monitored pointing device dynamics and gestures of said user, estimating an average of negative values of acceleration of pointing device movement of said user in a direction perpendicular to a direction of movement of said pointing device;
based on estimation of said average of negative values of acceleration, differentiating between said user and another user interacting with said particular computerized financial service.

34. The method of claim 1, comprising:
based on monitored pointing device dynamics and gestures of said user, estimating a median of absolute values of angular velocity of pointing device movement of said user;
based on estimation of median of absolute values of angular velocity of pointing device movement of said user, differentiating between said user and another user interacting with said particular computerized financial service.

35. The method of claim 1, comprising:
based on monitored pointing device dynamics and gestures of said user, estimating a distribution of angular velocity of pointing device movement of said user;
based on estimation of distribution of angular velocity of pointing device movement of said user, differentiating between said user and another user interacting with said particular computerized financial service.

36. The method of claim 1, comprising:
based on monitored pointing device dynamics and gestures of said user, estimating a median speed of movement at a click event of said pointing device of said user;
based on estimation of median speed of movement at a click event of said pointing device of said user, differentiating between said user and another user interacting with said particular computerized financial service.

37. The method of claim 1, comprising:
based on monitored pointing device dynamics and gestures of said user, estimating an average of time difference between a mouseclick-down event and a mouseclick-up event of said pointing device of said user;
based on estimation of average of time difference between a mouseclick-down event and a mouseclick-up event of said pointing device of said user, differentiating between said user and another user interacting with said particular computerized financial service.

38. The method of claim 1, comprising:
based on monitored pointing device dynamics and gestures of said user, estimating an average direction of pre-mouseclick movements of said pointing device of said user;
based on estimation of average direction of pre-mouseclick movements of said pointing device of said user, differentiating between said user and another user interacting with said particular computerized financial service.

39. The method of claim 1, comprising:
based on monitored pointing device dynamics and gestures of said user, estimating a ratio between (i) mouse movement events of said user, to (ii) all mouse events of said user;
based on estimation of said ratio between (i) mouse movement events of said user, to (ii) all mouse events of said user, differentiating between said user and another user interacting with said particular computerized financial service.

40. The method of claim 1, comprising:
based on monitored pointing device dynamics and gestures of said user, estimating a ratio between (i) mouse click events of said user, to (ii) all mouse events of said user;
based on estimation of said ratio between (i) mouse click events of said user, to (ii) all mouse events of said user, differentiating between said user and another user interacting with said particular computerized financial service.

41. The method of claim 1, comprising:
based on monitored pointing device dynamics and gestures of said user, estimating a ratio between (i) mouse wheel events of said user, to (ii) all mouse events of said user;
based on estimation of said ratio between (i) mouse wheel events of said user, to (ii) all mouse events of said user, differentiating between said user and another user interacting with said particular computerized financial service.

42. The method of claim 1, comprising:
based on monitored pointing device dynamics and gestures of said user, estimating a ratio between (i) sharp mouse movements of said user, to (ii) all mouse movements of said user;

based on estimation of said ratio between (i) sharp mouse movements of said user, to (ii) all mouse movements of said user, differentiating between said user and another user interacting with said particular computerized financial service.

43. A process comprising:
- (A) during multiple usage sessions of multiple users with a particular online retailer, wherein each one of said users utilizes a pointing device and a keyboard for interacting with said particular online retailer, monitoring pointing device dynamics and gestures and keystrokes of each one of said users across multiple different pages of said particular online retailer;
- (B) differentiating between (i) a legitimate user of said particular online retailer, and (ii) an illegitimate user of said particular online retailer, based on an aggregate combination of:
  - (I) a first unique sequence in which each user visits multiple web-pages of said particular online retailer, and
  - (II) a second unique sequence in which each user engages with on-screen user interface (UI) elements within a single web-page of said particular online retailer, and
  - (III) a unique transition pattern in which each user transitions from a first on-screen component of a first web-page to a second on-screen component of a second web-page of said particular online retailer;
- (C) based on said differentiating, flagging a particular transaction of a particular user of said particular online retailer as possibly-fraudulent.

* * * * *